US012563467B2

(12) United States Patent
Awada et al.

(10) Patent No.:     US 12,563,467 B2
(45) Date of Patent:         Feb. 24, 2026

(54) HANDLING OF TIMING ADVANCE ACQUISITION FAILURE IN L1/2 TRIGGERED INTER-CELL MOBILITY

(71) Applicant: Nokia Technologies Oy, Espoo (FI)

(72) Inventors: Ahmad Awada, Munich (DE); Sanjay Goyal, Denville, NJ (US); Panagiotis Spapis, Munich (DE); Umur Karabulut, Munich (DE); Ali Karimidehkordi, Munich (DE); Halit Murat Gürsu, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 418 days.

(21) Appl. No.: 18/296,918

(22) Filed: Apr. 6, 2023

(65)                Prior Publication Data
US 2024/0340736 A1      Oct. 10, 2024

(51) Int. Cl.
*H04W 36/08*          (2009.01)
*H04W 36/00*          (2009.01)
            (Continued)

(52) U.S. Cl.
CPC ....... *H04W 36/08* (2013.01); *H04W 36/0069* (2018.08); *H04W 74/04* (2013.01); *H04W 76/10* (2018.02)

(58) Field of Classification Search
CPC ............. H04W 36/08; H04W 36/0069; H04W 36/0055; H04W 36/0058; H04W 36/0061; H04W 74/04; H04W 74/0833; H04W 74/004; H04W 74/006; H04W 74/0891; H04W 76/10; H04W 56/0045
(Continued)

(56)                References Cited

U.S. PATENT DOCUMENTS

2014/0211685 A1*    7/2014   Kim ...................... H04W 72/30
                                                                   370/312
2018/0270809 A1*    9/2018   Park ..................... H04W 24/02
                         (Continued)

FOREIGN PATENT DOCUMENTS

WO      WO-2024155221 A1 *   7/2024   ........ H04W 36/0077
WO      WO-2024176337 A1 *   8/2024   ............ H04W 74/08

OTHER PUBLICATIONS

WO 2024176337—English Translation (Year: 2024).*
                         (Continued)

*Primary Examiner* — Ricardo H Castaneyra

(74) *Attorney, Agent, or Firm* — Carter, DeLuca & Farrell LLP

(57)                ABSTRACT

There is provided a user equipment apparatus that includes at least one processor and memory storing instructions. The instructions, when executed by the at least one processor, cause the user equipment apparatus at least to: establish a connection with a serving cell controlled by a serving network node; perform configuration for L1/L2 triggered mobility (LTM) to a target cell, the target cell controlled by one of: the serving network node or a target network node; prior to receiving a command to switch to the target cell: transmit, towards the target cell, a random access preamble for acquiring timing advance for the target cell; and receive, from the serving network node, an instruction to acquire timing advance for the target cell.

16 Claims, 9 Drawing Sheets

(51) Int. Cl.
　　*H04W 74/04*　　　　(2009.01)
　　*H04W 76/10*　　　　(2018.01)

(58) Field of Classification Search
　　USPC ........ 370/331, 336, 329, 328, 252, 216, 350
　　See application file for complete search history.

(56) References Cited

U.S. PATENT DOCUMENTS

| | | | | |
|---|---|---|---|---|
| 2024/0147334 A1* | 5/2024 | Abraham | .............. | H04W 36/32 |
| 2024/0251308 A1* | 7/2024 | Chandrashekar | ... | H04W 36/087 |
| 2024/0284521 A1* | 8/2024 | Ryu | ...................... | H04W 36/04 |
| 2025/0168723 A1* | 5/2025 | Kim | ................. | H04W 36/0072 |

OTHER PUBLICATIONS

Extended European Search Report for EP 24160560.9 dated Sep. 10, 2024, 10 pages.

Goyal, et al., "Timing Advance Management for L1/L2-triggered Mobility", 3GPP R1-2300385, dated Feb. 17, 2023, XP052247528, 10 pages.

Goyal, et al., "Discussion on timing advance management for L1/L2-triggered mobility", 3GPP R1-2211307, dated Nov. 7, 2022, XP052221871, 8 pages.

Watanabe et al., "Discussion on Early sync phase of LTM", 3GPP R2-2301846, dated Feb. 17, 2023, XP052246472, 6 pages.

* cited by examiner

HANDLING OF TIMING ADVANCE ACQUISITION FAILURE IN L1/2 TRIGGERED INTER-CELL MOBILITY

FIELD

Various example embodiments relate generally to wireless networking and, more particularly, to timing advance management in wireless networking.

BACKGROUND

Wireless networking provides significant advantages for user mobility. A user's ability to remain connected while on the move provides advantages not only for the user, but also provides greater efficiency and productivity for society as a whole. As user expectations for connection reliability, data speed, and device battery life become more demanding, technology for wireless networking must also keep pace with such expectations. Accordingly, there is continuing interest in improving wireless networking technology.

SUMMARY

In accordance with aspects of the disclosure, a user equipment apparatus includes at least one processor and at least one memory storing instructions. The instructions, when executed by the at least one processor, cause the apparatus at least to: establish a connection with a serving cell controlled by a serving network node, the serving network node supports at least one of distributed unit, DU, functionality or a layer 2 protocol of a radio access network and which supports the serving cell; perform configuration for L1/L2 triggered mobility (LTM) to a target cell, the target cell controlled by one of: the serving network node or a target network node, the target network node supports at least one of distributed unit, DU, functionality or a layer 2 protocol of a radio access network and which supports the target cell; prior to receiving a command to switch to the target cell: transmit, towards the target cell, a random access preamble for acquiring timing advance for the target cell; and receive, from the serving network node, an instruction to re-transmit the random access preamble to the target cell for acquiring the timing advance for the target cell.

In an aspect of the disclosed user equipment apparatus, the instructions, when executed by the at least one processor, may further cause the user equipment apparatus at least to: prior to transmitting the random access preamble to the target cell, receive an order to transmit the Random access preamble; and after transmitting the random access preamble to the target cell and prior to receiving a command to switch to the target cell: receive from the serving network node a second order to transmit the random access preamble for the target cell, and increase a transmission power for transmitting the random access preamble based on the second order above a transmission power used to transmit the random access preamble towards that target cell based on the first order if the second order is received within a pre-determined time duration wherein the time duration is received from the serving network node.

In an aspect of the disclosed user equipment apparatus, the instructions, when executed by the at least one processor may further cause the user equipment apparatus at least to: receive a first order instructing the user equipment apparatus (UE) to perform a random access preamble transmission towards the target network node including an SSB; determine that a received signal power associated with a configured contention-free random access (CFRA) preamble of the SSB is below a threshold value; and in response to the determination, at least one of: transmit, towards the serving network node, an indication that the received signal power of the SSB associated with the configured CFRA preamble is no longer sufficient to perform the random access preamble transmission or transmit the random access preamble towards the target network node.

In an aspect of the disclosed user equipment apparatus, the instructions when executed by the at least one processor, may further cause the user equipment apparatus at least to: determine that a plurality of SSBs are received in different orders for the target cell; consider the plurality of SSBs as candidates for early TA acquisition based on the determination; determine that any received signal power that is associated with an SSB of the plurality of SSBs is above a threshold; use a corresponding random access preamble transmission for an early TA acquisition based on the determination or transmit, towards the serving network node, an indication that none of the plurality of SSBs can be used for transmission of the random access preamble to the target cell.

In an aspect of the disclosed user equipment apparatus, the instructions when executed by the at least one processor, may further cause the user equipment apparatus at least to receive, from the serving network node, a second instruction to acquire timing advance for the target cell. The instruction to acquire timing advance for the target cell may further include at least one of: a RACH occasion different than a RACH occasion of the first instruction, a second random access preamble different than the random access preamble of the first instruction, an instruction to cause the performance of retransmitting the random access preamble of the first instruction, or an instruction that when the second instruction is sent within certain time window after the first instruction cause the performance by the UE of increasing a power of the random access preamble transmission.

In accordance with aspects of the disclosure, a network node that supports at least one of central unit control plane (CU-CP) functionality or a layer 3 protocol of a radio access network, includes at least one processor; and at least one memory. The memory stores instruction which, when executed by the at least one processor, cause the network node at least to: establish a connection with a user equipment apparatus (UE) via a serving cell supported by a serving network node, the serving network node supports at least one of distributed unit, DU, functionality or a layer 2 protocol of a radio access network; transmit, towards the UE, a message configured to configure the UE for L1/L2 triggered mobility (LTM) to a target cell, the target cell controlled by one of: the serving network node or a target network node, the target network node supports at least one of distributed unit, DU, functionality or a layer 2 protocol of a radio access network, and which supports a target cell; and transmit towards at least one of the serving network node or the target network node a duration of a timer T.

In an aspect of the disclosed network node, the instructions when executed by the at least one processor, may further cause the network node at least to: receive, from the target network node, an indication that the random access preamble transmission has not been received from the UE and that a timing advance (TA) value could not be estimated; and prior to transmitting a command to switch to the target cell: cause the serving network node to transmit, toward the UE, an instruction to transmit a random access preamble to the target cell for acquiring timing advance for the target cell; and cause the serving network node to transmit, toward the UE, an instruction to re-transmit the random access preamble to the target cell for acquiring the timing advance for the target cell, in response to the indication from the target network node.

In an aspect of the disclosed network node, the instructions when executed by the at least one processor, may further cause the network node at least to cause the target network node to transmit the indication towards the serving network node when the timer T has expired.

In an aspect of the disclosed network node, a duration of the timer T may be transmitted towards the target network node during L1/L2 triggered mobility (LTM) preparation.

In an aspect of the disclosed network node, a duration of the timer T may be transmitted towards the target network node when the serving network node has triggered the UE to send the random access preamble transmission to the target cell.

In an aspect of the disclosed network node, the timer T may be initiated based on the target network node receiving an indication from the serving network node that the UE has been instructed to perform TA acquisition with respect to a target cell among a set of candidate target cells that is controlled by the target network node.

In an aspect of the disclosed network node, the indication may include information about at least one of a time occasion or a contention-free random access (CFRA) resource that the UE has been configured to perform random access (RA).

In an aspect of the disclosed network node, the instructions when executed by the at least one processor, may further cause the network node at least to: cause the target network node to stop the timer T when the target network node successfully receives the random access preamble transmission from the UE; and cause the target network node to transmit an estimated TA of the UE towards the serving network node.

In an aspect of the disclosed network node, the timer T may expire when the target network node fails to receive the random access preamble from the UE within a time duration of timer T.

In accordance with aspects of the disclosure, a network node that supports at least one of central unit control plane (CU-CP) functionality, or a layer 3 protocol of a radio access network, and supporting a serving cell, including: at least one processor; and at least one memory. The memory stores instruction which, when executed by the at least one processor, cause the network node at least to: establish a connection with a user equipment apparatus (UE) via a serving network node, wherein the serving network node supports at least one of distributed unit, DU, functionality or a layer 2 protocol of a radio access network and which supports a serving cell; and configure the serving network node for L1/L2 triggered mobility (LTM) and indicate a timer T to cause the serving network node to trigger the UE to perform re-transmission of a physical random access channel (PRACH) preamble based on an expiration of a timer T, wherein the timer T is configured to supervise a reception of an estimated timing advance (TA) from a target network node controlling a target cell among a set of candidate target cells, wherein the target network node supports at least one of distributed unit, DU, functionality or a layer 2 protocol of a radio access network and which supports the set of target cells.

In an aspect of the disclosed network node, the instructions when executed by the at least one processor, may further cause the network node at least to transmit a duration of timer T towards the serving cell.

In an aspect of the disclosed network node, the instructions when executed by the at least one processor, may further cause the network node at least to initiate the timer T in response to the UE receiving a communication from the DU to perform a transmission of the random access preamble to the target cell.

In an aspect of the disclosed network node, the instructions when executed by the at least one processor, may further cause the network node at least to: receive an acknowledgement message from the UE with respect to instructions received by the UE; and initiate the timer T from the time the serving network node in response to the received acknowledgement message.

In an aspect of the disclosed network node, the instructions when executed by the at least one processor, may further cause the network node at least to: receive an estimated TA value for the UE from the target network node; and stop the timer T in response to the received.

In an aspect of the disclosed network node, the instructions when executed by the at least one processor, may further cause the network node at least to: determine the expiration of the timer T and transmit an instruction towards the UE to perform re-transmission of the random access preamble upon expiration of the timer T.

In an aspect of the disclosed network node, the instructions when executed by the at least one processor, may further cause the network node at least to: receive a measurement report from the UE; determine whether to cancel TA acquisition for a target cell based on the measurement report; and transmit an instruction towards the UE to cancel the TA acquisition for the target cell based on the determination.

In an aspect of the disclosed network node, the instructions when executed by the at least one processor, may further cause the network node at least to transmit an indication towards the UE of at least one of a time duration or a number of RACH occasions during which the UE is allowed to transmit the random access preamble towards the target cell.

In accordance with aspects of the disclosure, a serving network node that supports at least one of distributed unit, DU, functionality or a layer 2 protocol of a radio access network, includes: at least one processor; and at least one memory storing instructions which, when executed by the at least one processor, cause the serving network node at least to: establish a connection with a user equipment apparatus (UE) via a serving cell supported by the network node; determine that L1/L2 triggered mobility (LTM) towards a target cell is configured for the UE, the target cell controlled by one of: the serving network node or a target network node, the target network node supports at least one of distributed unit, DU, functionality or a layer 2 protocol of a radio access network, and which supports a target cell; prior to transmitting a command to connect to the target cell: transmit, towards the UE, a first instruction configured to cause the performance of acquiring a timing advance for the target cell; transmit, towards the target network node, a second instruction configured to cause the performance of monitoring and reporting receipt of a random access preamble from the UE; and monitor and determine whether a report is received from the target network node within a time window, and whether the report includes an information related to a successful or an unsuccessful acquisition of the timing advance, in case of a successful acquisition proceed with a first action, and in case of unsuccessful acquisition proceed with a second action, first and second action being different.

In an aspect of the disclosed network node, the second instruction may include at least one of a timer T duration or a value of the time window.

In an aspect of the disclosed network node, the at least one of a timer T duration or a value of the time window may be received from a network node that supports at least one of central unit control plane (CU-CP) functionality or a layer 3 protocol of a radio access network.

In an aspect of the disclosed network node, the instructions when executed by the at least one processor, may further cause the serving network node at least to: receive an L1 measurement report and determine whether to switch or connect UE towards target cell based on the L1 measurement report.

In an aspect of the disclosed network node, the instructions when executed by the at least one processor, may further cause the serving network node at least to: transmit, towards the UE, a second instruction to acquire timing advance for the target cell, and, towards the target network node.

In an aspect of the disclosed network node, the second instruction may include at least one of a RACH occasion different than a RACH occasion of the first instruction, a second random access preamble different than the random access preamble of the first instruction, an instruction to cause the performance of retransmitting the random access preamble of the first instruction, or an instruction that when the second instruction is sent within certain time window after the first instruction cause the performance by the UE of increasing a power of the random access preamble transmission.

In an aspect of the disclosed network node, the instructions when executed by the at least one processor, may further cause the serving network node at least to: stop considering the target cell for a potential cell change; monitor receipt of L1 measurement report; determine whether to switch or connect UE towards a second target cell based on L1 measurement report; and transmit, towards the UE, a second instruction to acquire timing advance for the second target cell, based on the determination.

In an aspect of the disclosed network node, the instructions when executed by the at least one processor, may further cause the serving network node at least to: determine whether a successful acquisition of a timing advance related to a second target cell has been received; and stop considering the target cell for a potential cell change based on the determination.

According to some aspects, there is provided the subject matter of the independent claims. Some further aspects are defined in the dependent claims.

BRIEF DESCRIPTION OF THE DRAWINGS

Some example embodiments will now be described with reference to the accompanying drawings.

DETAILED DESCRIPTION

In the following description, certain specific details are set forth in order to provide a thorough understanding of disclosed aspects. However, one skilled in the relevant art will recognize that aspects may be practiced without one or more of these specific details or with other methods, components, materials, etc. In other instances, well-known structures associated with transmitters, receivers, or transceivers have not been shown or described in detail to avoid unnecessarily obscuring descriptions of the aspects.

Reference throughout this specification to "one aspect" or "an aspect" means that a particular feature, structure, or characteristic described in connection with the aspect is included in at least one aspect. Thus, the appearances of the phrases "in one aspect" or "in an aspect" in various places throughout this specification are not necessarily all referring to the same aspect. Furthermore, the particular features, structures, or characteristics may be combined in any suitable manner in one or more aspects.

Aspects or embodiments described in the present disclosure may be implemented in wireless networking apparatuses, such as, without limitation, apparatuses utilizing Worldwide Interoperability for Microwave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, enhanced LTE (eLTE), 5G New Radio (5G NR), and 802.11ax (Wi-Fi 6), among other wireless networking systems. The term 'eLTE' here denotes the LTE evolution that connects to a 5G core. LTE is also known as evolved UMTS terrestrial radio access (EUTRA) or as evolved UMTS terrestrial radio access network (EUTRAN).

Aspects of the present disclosure relate to timing advance management in 5G NR. Aspects of the present disclosure provide various advantages, including, for example, better efficiency during and after a handover using L1/L2 triggered mobility (LTM).

As used herein, the terms "transmit towards," "receive from," and "cooperate with," (and their variations) include communications that may or may not involve communications through one or more intermediate devices or nodes. The term "acquire" (and its variations) includes acquiring in the first instance or reacquiring after the first instance. The term "connection" may mean a physical connection or a logical connection.

Figure 1:
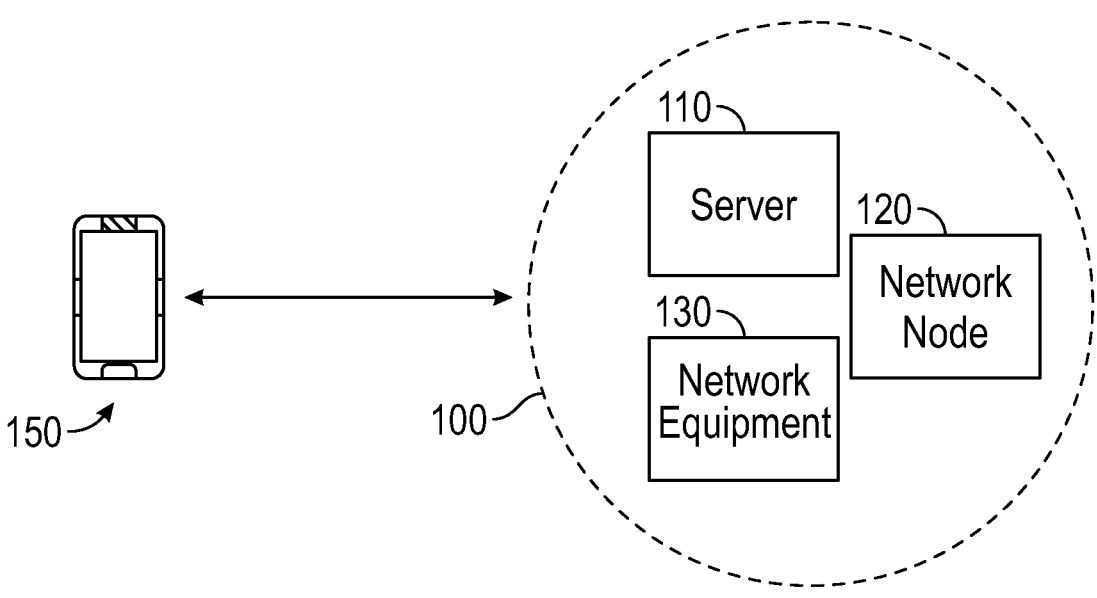
FIG. 1 is a diagram of an example embodiment of wireless networking between a network system and a user equipment apparatus (UE), according to one illustrated aspect of the disclosure.

FIG. 1 is a diagram depicting an example of wireless networking between a network system 100 and a user equipment apparatus (UE) 150. The network system 100, for example, may include one or more network nodes 120, one or more servers 110, and/or one or more network equipment 130 (e.g., test equipment). The network nodes 120 will be described in more detail below. As used herein, the term "network apparatus" may refer to any component of the network system 100, such as the server 110, the network node 120, the network equipment 130, any component(s) of the foregoing, and/or any other component(s) of the network system 100. Examples of network apparatuses include, without limitation, apparatuses implementing 5G NR and apparatuses implementing Wi-Fi 6, among others. The present disclosure describes embodiments related to 5G NR and embodiments that involve aspects defined by 3rd Generation Partnership Project (3GPP). However, it is contemplated that embodiments relating to other wireless networking technologies are encompassed within the scope of the present disclosure.

The following description provides further details of examples of network nodes. In a 5G NR network, a gNodeB (also known as gNB) may include, e.g., a node that provides NR user plane and control plane protocol terminations towards the UE and that is connected via a NG interface to the 5G core (5GC), e.g., according to 3GPP TS 38.300 V16.6.0 (2021-06) section 3.2, which is hereby incorporated by reference herein.

A gNB supports various protocol layers, e.g., Layer 1 (L1)—physical layer, Layer 2 (L2), and Layer 3 (L3).

The layer 2 (L2) of NR is split into the following sublayers: Medium Access Control (MAC), Radio Link Control (RLC), Packet Data Convergence Protocol (PDCP) and Service Data Adaptation Protocol (SDAP), where, e.g.:

The physical layer offers to the MAC sublayer transport channels;

The MAC sublayer offers to the RLC sublayer logical channels;

The RLC sublayer offers to the PDCP sublayer RLC channels;

The PDCP sublayer offers to the SDAP sublayer radio bearers;

The SDAP sublayer offers to 5GC quality of service (QoS) flows;

"Comp." refers to header compression and "Segm." refers to segmentation;

Control channels include broadcast control channel (BCCH) and physical control channel (PCCH).

Layer 3 (L3) includes, e.g., radio resource control (RRC), e.g., according to 3GPP TS 38.300 V16.6.0 (2021-06) section 6, which is hereby incorporated by reference herein.

A gNB central unit (gNB-CU) includes, e.g., a logical node hosting, e.g., radio resource control (RRC), service data adaptation protocol (SDAP), and packet data convergence protocol (PDCP) protocols of the gNB or RRC and PDCP protocols of the en-gNB, that controls the operation of one or more gNB distributed units (gNB-DUs). The gNB-CU terminates the F1 interface connected with the gNB-DU. A gNB-CU may also be referred to herein as a CU, a central unit, a centralized unit, or a control unit.

A gNB Distributed Unit (gNB-DU) includes, e.g., a logical node hosting, e.g., radio link control (RLC), media access control (MAC), and physical (PHY) layers of the gNB or en-gNB, and its operation is partly controlled by the gNB-CU. One gNB-DU supports one or multiple cells. One cell is supported by only one gNB-DU. The gNB-DU terminates the F1 interface connected with the gNB-CU. A gNB-DU may also be referred to herein as DU or a distributed unit.

A gNB-CU-Control Plane (gNB-CU-CP) includes, e.g., a logical node hosting, e.g., the RRC and the control plane part of the PDCP protocol of the gNB-CU for an en-gNB or a gNB. The gNB-CU-CP terminates the E1 interface connected with the gNB-CU-User Plane (gNB-CU-UP) and the F1-C interface connected with the gNB-DU.

A gNB-CU-User Plane (gNB-CU-UP) includes, e.g., a logical node hosting, e.g., the user plane part of the PDCP protocol of the gNB-CU for an en-gNB, and the user plane part of the PDCP protocol and the SDAP protocol of the gNB-CU for a gNB. The gNB-CU-UP terminates the E1 interface connected with the gNB-CU-CP and the F1-U interface connected with the gNB-DU, e.g., according to 3GPP TS 38.401 V16.6.0 (2021-07) section 3.1, which is hereby incorporated by reference herein.

Different functional splits between the central and distributed unit are possible, e.g., called options:

Option 1 (1A-like split):
The function split in this option is similar to the 1A architecture in dual connectivity (DC). RRC is in the central unit. PDCP, RLC, MAC, physical layer, and RF are in the distributed unit.

Option 2 (3C-like split):
The function split in this option is similar to the 3C architecture in DC. RRC and PDCP are in the central unit. RLC, MAC, physical layer, and RF are in the distributed unit.

Option 3 (intra RLC split):
Low RLC (partial function of RLC), MAC, physical layer, and RF are in the distributed unit. PDCP and high RLC (the other partial function of RLC) are in the central unit.

Option 4 (RLC-MAC split):
MAC, physical layer, and RF are in the distributed unit. PDCP and RLC are in the central unit.

Or else, e.g., according to 3GPP TR 38.801 V14.0.0 (2017-03) section 11, which is incorporated by reference herein.

As used herein, the term "network node" may refer to any of a gNB, a gNB-CU, a gNB-DU, a gNB-CU-CP, or a gNB-CU-UP, or any combination of them.

A RAN (radio access network) node or network node such as, e.g. a gNB, base station, gNB-CU, or gNB-DU, or parts thereof, may be implemented using, e.g., an apparatus with at least one processor and/or at least one memory with processor-readable instructions ("program") configured to support and/or provision and/or process CU and/or DU related functionality and/or features, and/or at least one protocol (sub-)layer of a RAN (radio access network), e.g., layer 2 and/or layer 3. An example of such an apparatus and components will be described in connection with FIG. 2 below.

The gNB-CU and gNB-DU parts may, e.g., be co-located or physically separated. The gNB-DU may even be split further, e.g., into two parts, e.g., one including processing equipment and one including an antenna. A central unit (CU) may also be called BBU/REC/RCC/C-RAN/V-RAN, O-RAN, or part thereof. A distributed unit (DU) may also be called RRH/RRU/RE/RU, or part thereof. Hereinafter, in various example embodiments of the present disclosure, a network node, which supports at least one of central unit control plane functionality or a layer 3 protocol of a radio access network, may be, e.g., a gNB-CU-CP. Similarly, a network node, which supports at least one of distributed unit functionality or a layer 2 protocol of the radio access network, may be, e.g., a gNB-DU.

A gNB-CU may support one or multiple gNB-DUs. A gNB-DU may support one or multiple cells and, thus, could support a serving cell for a user equipment apparatus (UE) or support a candidate cell for handover, dual connectivity, and/or carrier aggregation, among other procedures. Examples of such procedures will be described below in connection with FIG. 3 and FIG. 4.

The user equipment apparatus (UE) 150 may be or include a wireless or mobile device, an apparatus with a radio interface to interact with a RAN (radio access network), a smartphone, an in-vehicle apparatus, an IoT device, or a M2M device, among other types of user equipment. Such UE 150 may include: at least one processor; and at least one memory including program code; where the at least one memory and the computer program code are configured to, with the at least one processor, cause the apparatus at least to perform certain operations, such as, e.g., RRC connection to the RAN. An example of components of a UE will be described in connection with FIG. 2. In embodiments, the UE 150 may be configured to generate a message (e.g., including a cell ID) to be transmitted via radio towards a RAN (e.g., to reach and communicate with a serving cell). In embodiments, the UE 150 may generate and transmit and receive RRC messages containing one or more RRC PDUs (packet data units). Persons skilled in the art will understand RRC protocol as well as other procedures a UE may perform.

With continuing reference to FIG. 1, in the example of a 5G NR network, the network system 100 provides a cell, which defines a coverage area of the network system 100. As described above, the network system 100 may include a gNB of a 5G NR network or may include any other apparatus configured to control radio communication and manage radio resources within a cell. As used herein, the term "resource" may refer to radio resources, such as a resource block (RB), a physical resource block (PRB), a radio frame, a subframe, a time slot, a sub-band, a frequency region, a sub-carrier, a beam, etc. In embodiments, the network node 120 may be called a base station.

FIG. 1 provides an example and is merely illustrative of a network system 100 and a UE 150. Persons skilled in the art will understand that the network system 100 includes components not illustrated in FIG. 1 and will understand that other user equipment apparatuses may be in communication with the network system 100.

Figure 2:
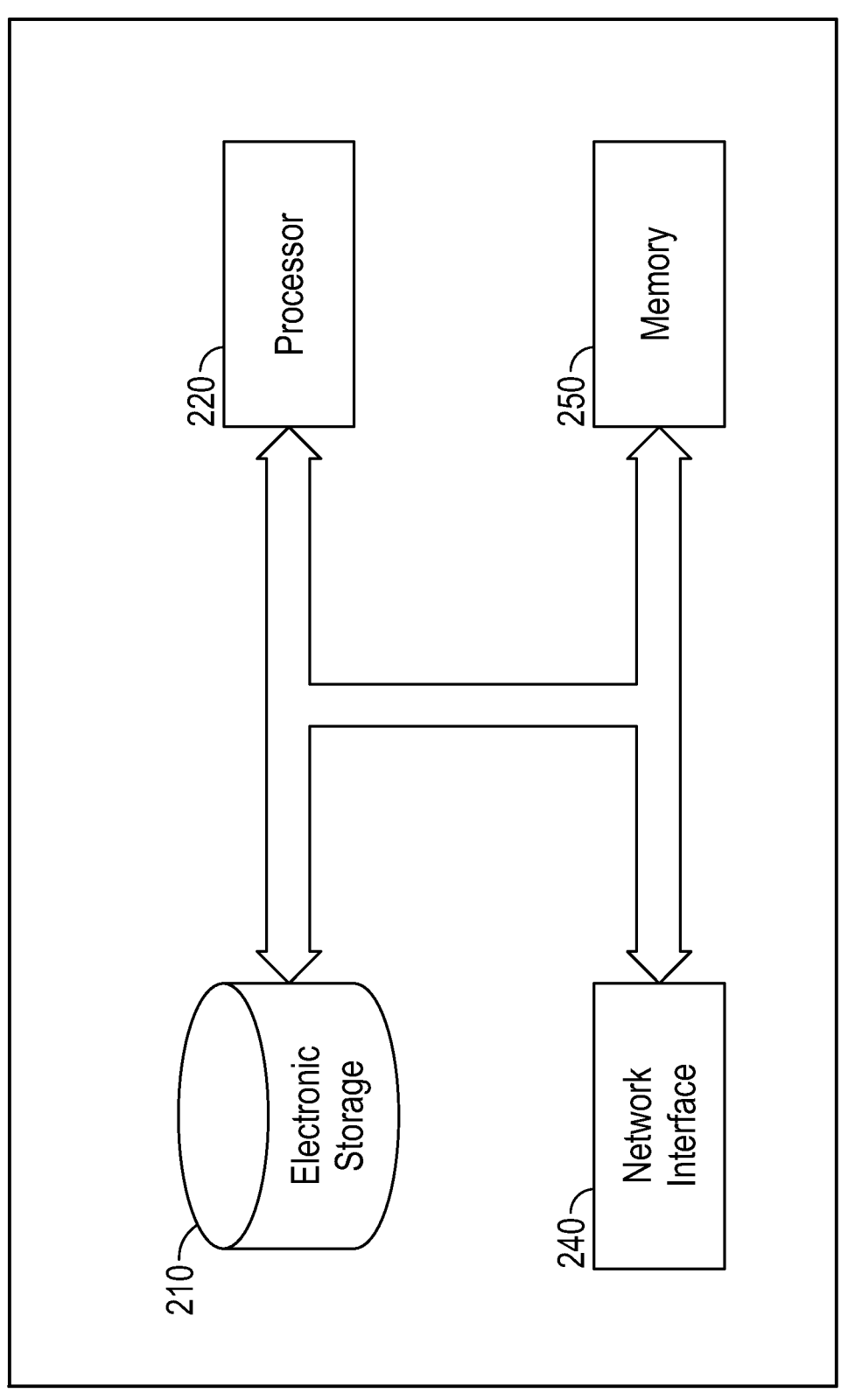
FIG. 2 is a diagram of an example embodiment of components of an apparatus, according to one illustrated aspect of the disclosure.

Referring now to FIG. 2, there is shown a block diagram of example components of a UE or a network apparatus. The apparatus includes an electronic storage 210, a processor 220, a memory 250, and a network interface 240. The various components may be communicatively coupled with each other. The processor 220 may be and may include any type of processor, such as a single-core central processing unit (CPU), a multi-core CPU, a microprocessor, a digital signal processor (DSP), a System-on-Chip (SoC), or any other type of processor. The memory 250 may be a volatile type of memory, e.g., RAM, or a non-volatile type of memory, e.g., NAND flash memory. The memory 250 includes processor-readable instructions that are executable by the processor 220 to cause the apparatus to perform various operations, including those mentioned herein.

The electronic storage 210 may be and include any type of electronic storage used for storing data, such as hard disk drive, solid state drive, and/or optical disc, among other types of electronic storage. The electronic storage 210 stores processor-readable instructions for causing the apparatus to perform its operations and stores data associated with such operations, such as storing data relating to 5G NR standards, among other data. The network interface 240 may implement wireless networking technologies such as 5G NR, Wi-Fi 6, and/or other wireless networking technologies.

The components shown in FIG. 2 are merely examples, and persons skilled in the art will understand that an apparatus includes other components not illustrated and may include multiples of any of the illustrated components. Such and other embodiments are contemplated to be within the scope of the present disclosure.

Figure 3:
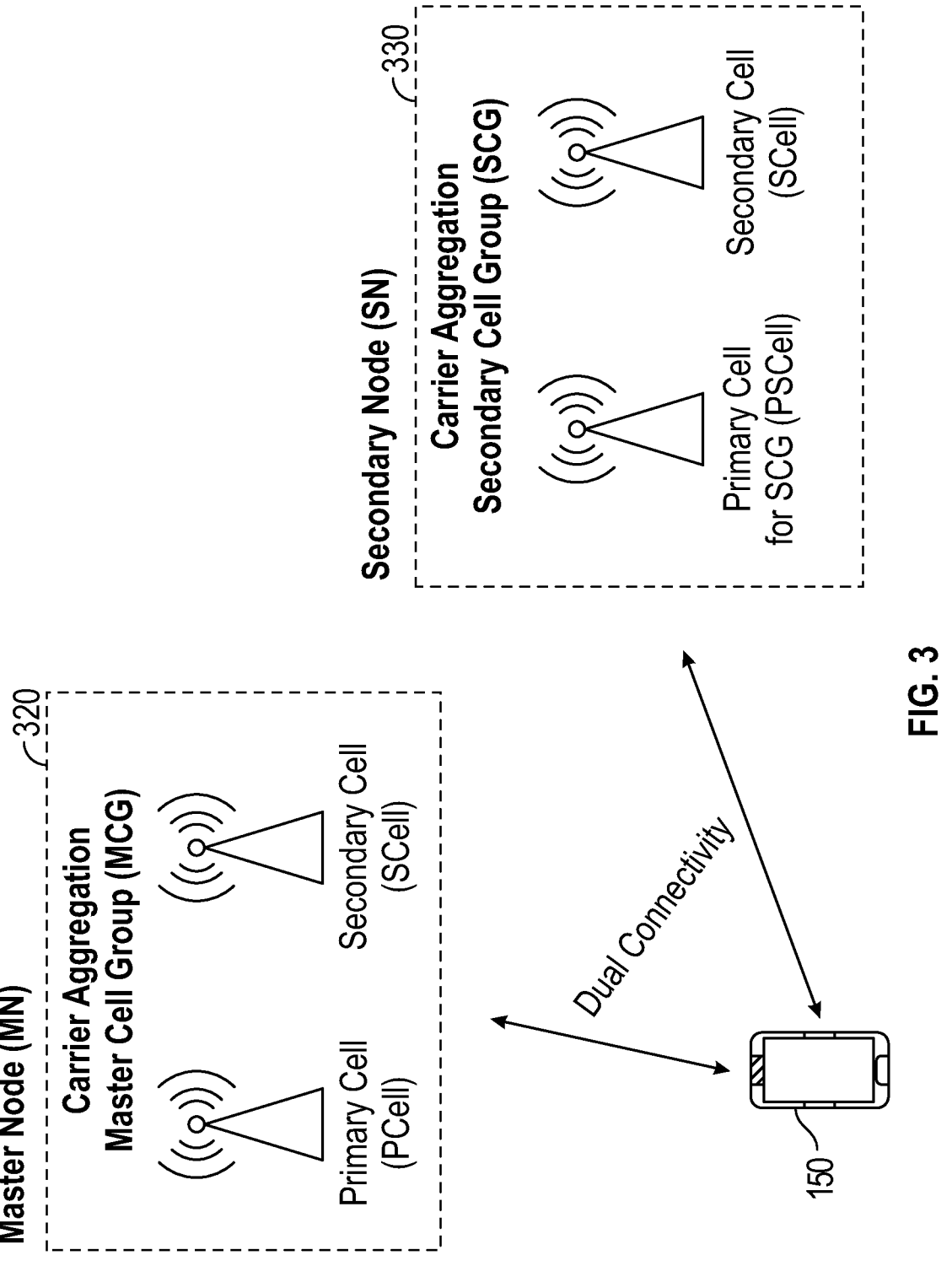
FIG. 3 is a diagram of an example embodiment of dual connectivity (DC) and carrier aggregation (CA), according to one illustrated aspect of the disclosure.

FIG. 3 is a diagram depicting an example of dual connectivity (DC) and carrier aggregation (CA). Dual connectivity allows a UE 310 to simultaneously connect to two network nodes, which may be referred to as a master node (MN) 320 and a secondary node (SN) 330. In embodiments, the MN 320 and/or the SN 330 may be a 5G New Radio (NR) node (e.g., gNB), among other types of nodes. In embodiments, the MN 320 and/or SN 330 may be base stations.

In embodiments, the MN 320 connects to a core network, such as a 5G core (5GC), and provides a control plane connection between a UE 310 and the core network, while the SN 330 connects to the MN 320 (e.g., via an Xn interface) and provides additional resources for user plane traffic. In embodiments, the MN 320 handles signaling messages, such as radio resource control (RRC) signaling messages. In embodiments, using signaling radio bearers (SRB) for 5G NR networks (e.g., SRB3), the SN 330 may handle signaling messages, such as RRC signaling messages, as well. Persons skilled in the art will understand RRC and SRB.

Carrier aggregation is illustrated in FIG. 3. While FIG. 3 shows carrier aggregation in conjunction with dual connectivity, carrier aggregation may be used without dual connectivity, as well. Carrier aggregation enables a UE 410 to simultaneously connect with multiple cells so as to operate at multiple frequencies at the same time. In embodiments, the multiple cells may be located at a single base station and/or at a common location (e.g., small cells or femtocells at a facility), among other possibilities. One or more cells that may be usable by a UE under carrier aggregation may be referred to as a "cell group." When carrier aggregation is used with dual connectivity, the master node and/or the secondary node may have a cell group. A cell group of a master node may be referred to as a master cell group (MCG), and a cell group of a secondary node may be referred to as a secondary cell group (SCG). As shown in FIG. 3, the MCG includes a primary cell (PCell) and may include one or more secondary cells (SCell). The SCG includes a primary cell of a secondary cell group (PSCell) and may include one or more secondary cells (SCell). Persons skilled in the art will understand the characteristics and functions of such cells and cell groups.

The example of FIG. 3 is merely illustrative of dual connectivity and carrier aggregation. The descriptions below may refer to dual connectivity and/or carrier aggregation. For example, in relation setting up dual connectivity, a cell which is a candidate for a PSCell may be referred to as a target cell, a candidate cell, or a target candidate cell, which may be used interchangeably. As another example, in relation to carrier aggregation, a cell which is a candidate for a SCell may also be referred to as a target cell, a candidate cell, or a target candidate cell. It will be understood that such references are not limited to the example illustrated in FIG.

3. Other arrangements different from FIG. 3 are contemplated to be within the scope of the present disclosure.

Figure 4:
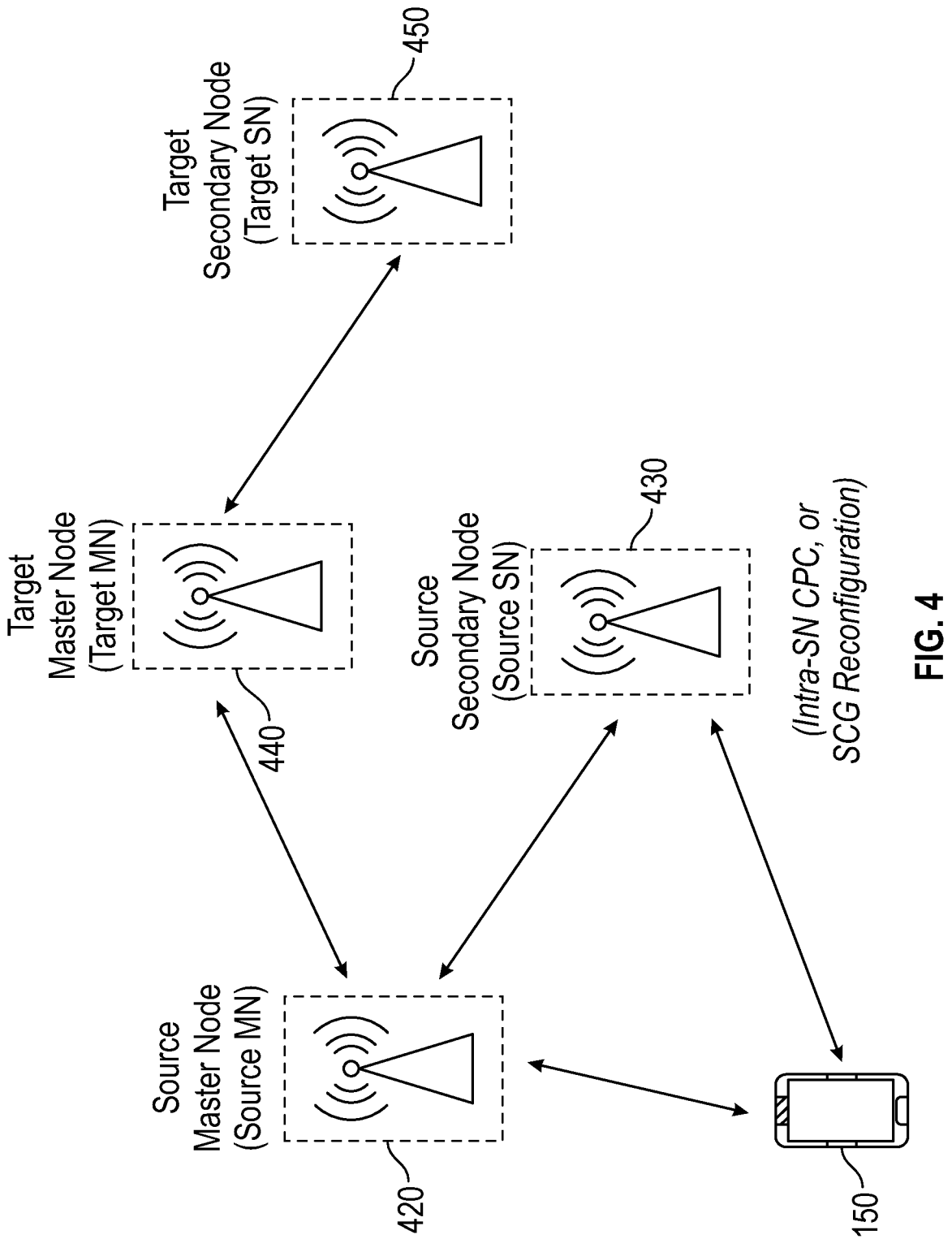
FIG. 4 is a diagram of an example embodiment of a handover procedure, according to one illustrated aspect of the disclosure.

FIG. 4 depicts an example of a handover scenario. Handover (HO) refers to a procedure that transitions the servicing of a UE from a source node and/or cell to a target node and/or cell. Handover may be performed, for example, when a UE transits between cells, among other scenarios. FIG. 4 shows a UE 410, a source MN 420, a source SN 430, a target MN 440, and a target SN 450.

The standards of 5G 3GPP (3rd Generation Partnership Project) Releases 15, 16, and 17 enhanced handover operations in various ways. Further enhancements are being developed under the term Layer 1/Layer 2 triggered mobility (LTM), which may also be referred to as L1/L2 triggered mobility, L1/2 inter-cell mobility, L1/2 handover, or lower layer (L1/2) mobility. These terms may be used interchangeably. A L1/L2 signal, message, or command sent by a network node to trigger a cell switch at the UE is referred as a "cell switch command." In LTM, the decision about a cell switch is based on L1 measurements and is made in the MAC layer in a distributed unit (DU). A cell switch command includes a MAC control element (MAC CE). The cell that is the target of a handover may be referred to herein as a target cell, a candidate cell, or a target candidate cell, which may be used interchangeably.

In the case of dual connectivity, a handover may involve a handover from a source MN 420 to a target MN 440, a handover from a source SN 430 to a target SN 450, a change of PCell within a MN, and/or a change of PSCell within a SN. In the case of dual connectivity, a handover to a target MN 440 may involve coordination with a target SN 450, as well. Specific standards that may be relevant include, without limitation, 3GPP TS 37.340 and TS 38.423.

The example of a handover depicted in FIG. 4 is merely illustrative. Variations are contemplated to be within the scope of the present disclosure.

FIG. 3 and FIG. 4 illustrate examples of operations and functionality that involve multiple network nodes and/or cells. Other operations and functionality may involve multiple nodes and/or cells, as well, such as multiple transmission and reception point (mTRP) and dynamic switching, among others. Such operations may involve a UE communicating with a target DU supporting a candidate target cell. A procedure for a UE to establish communications with a target DU is referred to as random access procedure. Random access procedure may be used for initial access, small data transmissions in inactive and transition from RRC_Inactive to RRC_Connected, as well as in beam failure recovery, connection re-establishment, handover, and cell addition, among other procedures which persons skilled in the art will recognize.

Figure 5:
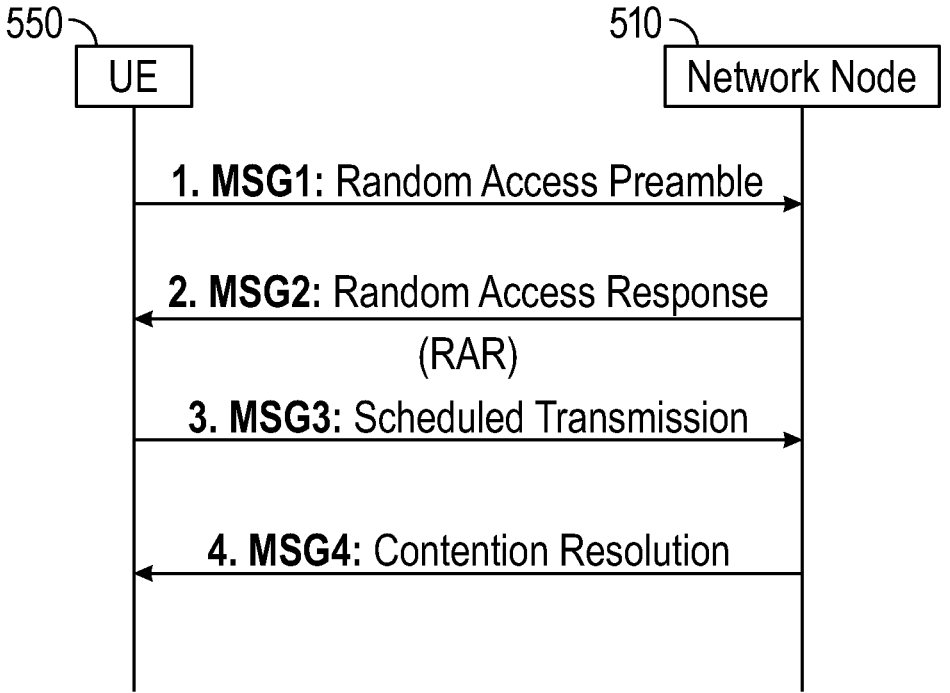
FIG. 5 is a diagram of an example embodiment of a contention-based random access procedure, according to one illustrated aspect of the disclosure.

Two types of random access procedures include contention-based random access (CBRA) and contention-free random access (CFRA). FIG. 5 is a diagram of an example of a contention-based random access (CBRA) procedure. In the illustrated example, the signals include a random access preamble (MSG1) transmitted by the UE 550 towards the network node 510, a random access response (MSG2) transmitted from the network node 510 towards the UE 550, a schedule transmission (MSG3) transmitted from the UE 550 towards the network node 510, and a contention resolution (MSG4) transmitted from the network node 510 towards the UE 550.

For MSG1, the UE 550 selects a usable random access preamble based on information elements in a signal synchronization block (SSB), which persons skilled in the art will understand. The UE 550 sends the random access preamble (MSG1) towards the network node 510 using a specific time and frequency resource known as random access occasion (RO). The UE 550 also provides an identity, called random access radio network temporary identity (RA-RNTI), to the network so that the network can address it in the next step.

For MSG2, the network node 110 detects the preamble, calculates various quantities, and sends a physical uplink shared channel (PUSCH) uplink (UL) grant towards the UE 550. This is called the random access response (RAR), which is sent as MSG2 addressed to the UE 550 with the relevant RA-RNTI and indicates to the UE 550 where in frequency and when in time it can transmit MSG3 on the PUSCH.

For MSG3, in response to receiving the MSG2 from the network node 510, the UE 550 sends MSG3 using the UL grant provided in the RAR. Because the RAR provides a time resource allocation, the UE 550 sends MSG3 towards the network node 510 at a timing specified by the time resource allocation and is a scheduled transmission. This MSG3 may be called a radio resource control (RRC) connection request message.

For MSG4, the network node 510 may send MSG4 towards the UE 550 for contention resolution. Contention resolution may operate in the manner specified by 3GPP for 5G NR. After the random access procedure, assuming contention resolution is resolved favorably, the UE 550 becomes connected to the network node 510. After establishing a connection, various procedures would be handled by a gNB-CU in accordance with the CU-DU split, such as the example splits described above. Other aspects of contention-based random access (CBRA) will be understood by persons skilled in the art.

Another type of random access procedure is contention-free random access (CFRA) (not shown). In CFRA, the network node 510 transmits an allocated random access preamble towards the UE 550. The UE 550 receives the allocated random access preamble and sends the random access preamble to the network node 510 in a random access request as MSG1. Then, MSG2 and MSG3 are similar to those described in connection with CBRA. No conflict resolution is needed in CFRA based on use of an allocated random access preamble. Other aspects of contention-free random access (CFRA) will be understood by persons skilled in the art.

In accordance with aspects of the present application, the present disclosure relates to timing advance (TA) management with respect to candidate target cells, which may be targets of handover, dual connectivity, carrier aggregation, mTRP, and/or dynamic switching, among other procedures. Timing advance refers to information used by a UE to time its uplink transmissions towards a network node to arrive at the network node in alignment with a reception time window. This information may be referred to herein as a timing advance value or TA value, and the process of acquiring a timing advance value may be referred to herein as timing advance acquisition, TA acquisition, acquiring timing advance, or acquiring TA (or variations thereof). As described above herein, the term "acquire" (and its variations) includes acquiring in the first instance or reacquiring after the first instance. A UE that has longer propagation delay to a network node may have a larger TA value than a UE that has shorter propagation delay to the network node.

In embodiments, a UE may acquire a separate TA value for each candidate target cell. The TA value for a candidate target cell may be determined based on information provided by a DU supporting the candidate target cell, for example, in a MAC control element (MAC CE) or in a random access response (RAR).

In embodiments, a UE may acquire a TA value for a timing advance group (TAG). A timing advance group (TAG) is a group of serving cells that is configured by RRC and that, for the cells with a UL configured, use the same timing reference cell and the same timing advance value. A TAG containing a SpCell (which is a PCell+PSCell) of a MAC entity is referred to as a primary timing advance group (PTAG), whereas the term secondary timing advance group (STAG) refers to TAGs that do not include a SpCell.

Each TAG may include a time alignment timer (TAT), which controls how long a MAC entity considers the serving cells belonging to the associated TAG to be uplink time-aligned. A TAT may also be referred to as timeAlignment-Timer. Procedures for maintenance of uplink time alignment may involve 3GPP Specification 38.331, which may provide procedures for, e.g., when a timing advance command MAC CE is received, when a timing advance command is received in a random access response message for a serving cell belonging to a TAG or in a MSGB for an SpCell, when an absolute timing advance command is received in response to a MSGA transmission including C-RNTI MAC CE, when a timeAlignmentTimer expires when it is associated with a PTAG, and/or when a timeAlignmentTimer expires when it is associated with a STAG, among other procedures.

In embodiments, TA may be acquired based on random access (RA) procedure (either CFRA or CBRA), such as, without limitation, a physical downlink control channel (PDCCH) ordered RA procedure, UE-triggered RA procedure, and/or a higher layer triggered RA procedure from a network node (other than a L3 handover command), among others. In embodiments, TA may be acquired based on non-RA procedure methods, such as, without limitation, sounding reference signal (SRS) based TA acquisition, receive timing difference based mechanisms (such as those in LTE), and/or UE-based TA measurement (including UE based TA measurement with one TAC from serving cell), among others. Such RA-based and non-RA-based methods for TA acquisition are within the scope of the present disclosure.

Figure 6A:
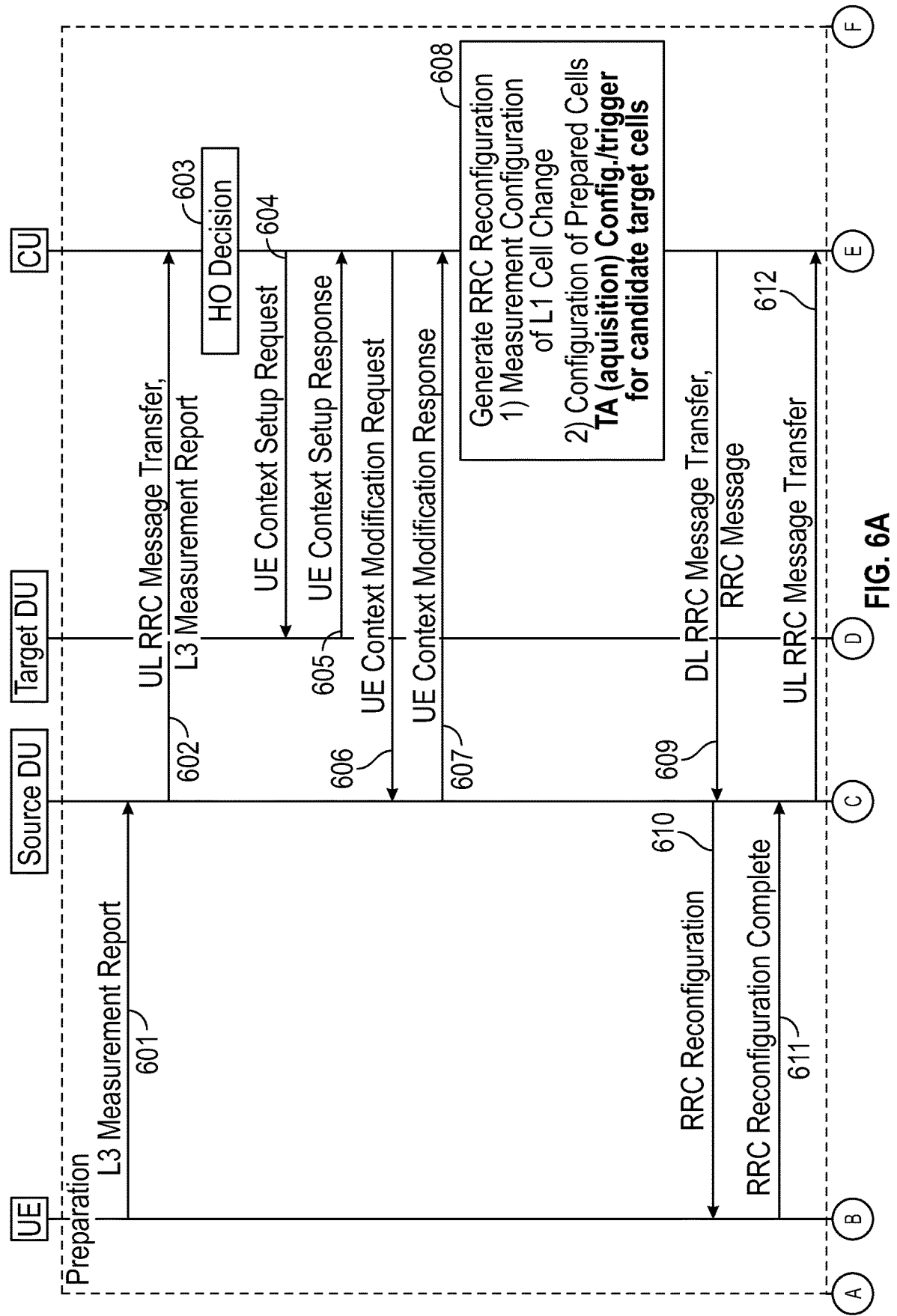
FIGS. 6A and 6B are diagrams of an example embodiment of signals and operations among a UE, a central unit (CU), a source distributed unit (DU), and a target DU, according to one illustrated aspect of the disclosure.
Figure 6B:
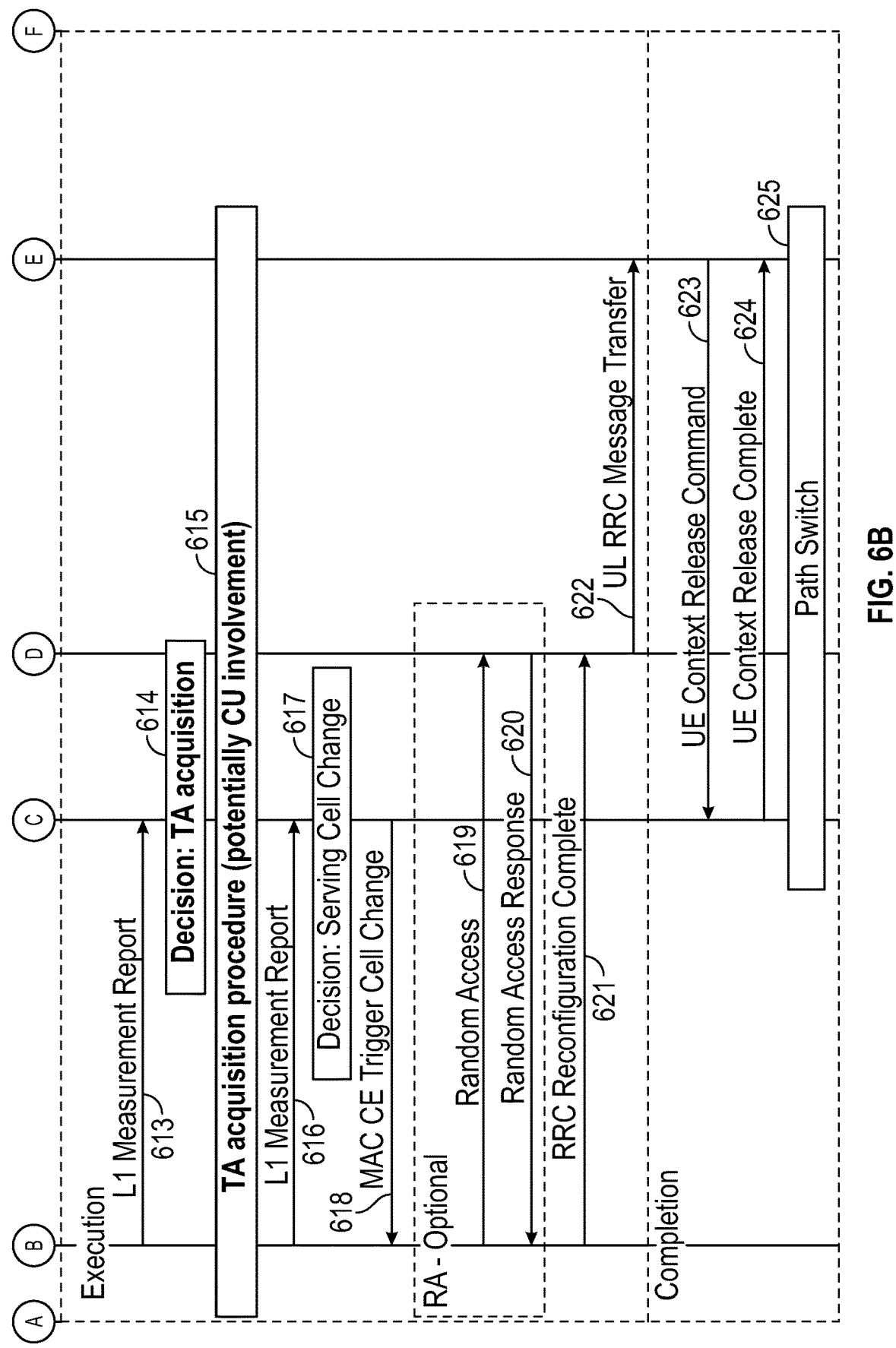

Referring now to FIG. 6A and FIG. 6B, example signals and operations for TA management are shown in relation to an inter-DU handover procedure. The handover procedure is merely illustrative, and it is contemplated that aspects of the disclosed technology may be applied to other procedures involving TA acquisition, such as, without limitation, dual connectivity, carrier aggregation, mTRP, and/or dynamic switching, among others. Additionally, the inter-DU scenario is illustrative, and aspects of the present disclosure may be applied to intra-DU scenarios, as well. Where the source DU and target DU are supported by different CUs, the source DU may be supported by a source CU and the target DU may be supported by a target CU, which can communicate via an Xn interface. As mentioned above, the terms "transmit towards", "receive from", and "cooperate with" (and their variations), include communications that may or may not involve communications through one or more intermediate devices or nodes. It is intended that any description referring to a DU shall also be treated as though the description refers to a network node which supports at least one of DU functionality or a layer 2 protocol of a radio access network (RAN). It is intended that any description referring to a CU shall also be treated as though the description refers to a network node which supports at least one of CU functionality or a layer 3 protocol of a radio access network (RAN).

The following paragraphs describe various signals and operations. It will be understood that the described signals may have associated operations and the described operations may have associated signals. Accordingly, a described signal may also be an operation and a described operation may also be a signal.

Prior to signal 601, the UE has established a connection with a DU (i.e., source DU) that supports the serving cell which serves the UE and has established a (logical) connection with the CU that supports the DU.

At signal 601, the UE transmits an L3 measurement report towards the source DU, and the source DU receives the L3 measurement report from the UE. Persons skilled in the art will understand an L3 measurement report, which may include averaged measurement samples of reference signals for a serving cell, for example. An L3 measurement report may indicate, for example, that a UE is nearing an edge of a cell and, thus, handover procedures should be initiated. At signal 602, the source DU forwards the L3 measurement report by transmitting the L3 measurement report towards the CU, and the CU receives the L3 measurement report from the source DU. At operation 603, the CU performs a handover (HO) decision, based on the L3 measurement report, about whether a handover should be prepared. For the illustrated embodiment, the CU decides that a handover should be prepared.

At signal 604, the CU transmits a UE context setup request towards the target DU to prepare the target DU for handover by setting up the UE context in the target DU. The target DU receives the UE context setup request from the CU and sets up the UE context. At signal 605, the target DU provides an acknowledgement by transmitting a UE context setup response towards the CU, and the CU receives the UE context setup response from the target DU. Although one target DU is illustrated, there may be more than one target DU if there are multiple candidate target cells. The signals at 604 and 605 may be used for each target DU and for multiple candidate target cells. The description below will refer to candidate target cell(s) to indicate there may be one candidate target cell or multiple candidate target cells and, where appropriate, will refer to target DU(s) supporting the candidate target cell(s). If a target DU and the source DU are supported by different CUs, the CUs may communicate using an Xn interface. For convenience, only one CU is illustrated (a CU supporting the source DU), but it is intended for the disclosed technology to apply to multi-CU situations, as well.

At signal 606, the CU transmits a UE context modification request towards the source DU for modification of the UE context in the source DU, if needed, and for the provision of the target cell information (e.g., target cell RS configuration, TCI states, etc.). The source DU receives the UE context modification request from the CU, modifies the UE context (if needed), and receives the target cell information. At signal 607, the source DU provides an acknowledgment by transmitting a UE context modification response towards the CU, and the CU receives the UE context modification response from the source DU.

In accordance with aspects of the present disclosure, at signals 604-607, the CU, the target DU(s), and the source DU may coordinate with each other regarding TA acquisition and configuration for the candidate target cell(s). For example, the source DU and the target DU(s) may coordinate (via the CU) on the method for the UE to acquire TA, such as a particular RA-based method or a particular non- RA-based method for acquiring TA. Further details of the coordination and the TA configuration will be described in more detail herein.

At operation 608, the CU creates an RRC reconfiguration message, which includes a measurement configuration for a L1 cell change, a configuration of prepared cells, and a TA acquisition configuration and trigger for the candidate target cells. In embodiments, the RRC reconfiguration message may include TA configuration if CU involvement is needed later (in the execution phase). The TA configuration may, for example, specify the method for a UE to acquire TA, which may be specified based on the cooperation described above between the source DU and the target DU(s). In embodiments, the TA acquisition method can be configured/triggered based on L3 measurements by the CU-CP (in coordination with the source-DU). The TA configuration may specify other TA management options, which will be described later herein.

At signal 609, the CU transmits the RRC reconfiguration message towards the source DU using a downlink (DL) RRC message transfer, and the source DU receives the RRC reconfiguration message from the CU. As mentioned above, the RRC reconfiguration message may include the TA configuration mentioned above. At signal 610, the source DU transmits the RRC reconfiguration message towards the UE to forward it to the UE, and the UE receives the RRC reconfiguration message from the source DU. The UE performs a reconfiguration based on the RRC reconfiguration message. At signal 611, the UE responds by transmitting a RRC reconfiguration complete message towards the source DU using an uplink (UL) RRC message transfer, and the source DU receives the RRC reconfiguration complete message from the UE. At signal 612, the source DU transmits the RRC reconfiguration complete message towards the CU to forward it to the CU, and the CU receives the RRC reconfiguration complete message from the source DU. In embodiments, the signals 609-612 may be described as part of a logical connection between the UE and the CU, such that the CU transmits the RRC message towards the UE, and the UE receives the RRC message from the CU.

In embodiments, the signals and operations 601-612 described above may be referred to as a preparation phase. After the preparation phase is an execution phase.

In the execution phase, the UE, based on its configuration, provides periodic L1 measurement reports. Persons skilled in the art will understand L1 measurements. At signal 613, the UE periodically transmits the L1 measurement reports towards the source DU, and the source DU receives the periodic L1 measurement reports from the UE.

At operation 614, the source DU decides, based on the received L1 measurement report, whether to trigger the UE to acquire TA for the set of candidate cells (i.e., candidate cells for the handover configured by the CU at operation 608).

At operation 615, the UE acquires TA for the candidate target cell(s) using the TA acquisition method specified in the RRC reconfiguration message of operation 608. As described above, TA may be acquired based on random access (RA) procedure (either CFRA or CBRA), such as, without limitation, a physical downlink control channel (PDCCH) ordered RA procedure, UE-triggered RA procedure, and/or a higher layer triggered RA procedure from a network node (other than a L3 handover command), among others. In embodiments, TA may be acquired based on non-RA procedure methods, such as, without limitation, sounding reference signal (SRS) based TA acquisition, receive timing difference based mechanisms (such as those in LTE), and/or UE-based TA measurement (including UE based TA measurement with one TAC from serving cell), among others. Such RA-based and non-RA-based methods for TA acquisition are within the scope of the present disclosure. After operation 615, the UE would have TA values for the candidate target cell(s) before a cell switch is triggered.

At signal 616, the UE continues L1 measurement reporting and periodically transmits L1 measurement reports towards the source DU, and the source DU receives the periodic L1 measurement reports from the UE. At operation 617, the source DU decides whether the UE should change serving cells. In embodiments, the source DU may decide that the UE should change serving cells if the L1 measurements fall below a threshold, for example. Once the source DU decides that the UE should be handed over to a cell (e.g., target cell supported by target DU), the source DU triggers the cell switch using a cell switch command (e.g., a MAC CE).

At signal 618, the cell switch command (e.g., MAC CE) is transmitted by the source DU towards the UE, and the UE receives the cell switch command (e.g., MAC CE) from the source DU. In embodiments, the cell switch command may contain the TA value for the target cell. In embodiments, the cell switch command may contain a TA configuration for the UE to use during and/or after the cell switch. The source DU may have the TA configuration from receiving the RRC message at signal 609. Further details of the TA configuration will be described later herein.

In response to the cell switch command, the UE applies the RRC configuration for the target cell of the target DU indicated by the cell switch command, to switch to the target DU/target cell as the serving cell. In embodiments, the UE may be configured to perform random access (RA) procedure to the target cell and target DU as shown in signals 619 and 620. However, in embodiments, the UE may be configured to not perform RA procedure to the target cell/target DU if it has already acquired the TA value of the target cell.

At signal 621, to initiate communication with the target DU, the UE transmits an RRC reconfiguration complete message towards the target DU using already configured uplink (UL) resources, and the target DU receives the RRC reconfiguration complete message from the UE. (Signals 622 ad 623 will be described below.) At signal 622, The target DU forwards the RRC reconfiguration complete message using UL RRC message transfer to transmit the RRC reconfiguration complete message towards the CU, and the CU receives the RRC reconfiguration complete message from the target DU. At signal 623, the CU transmits a UE context release command/request towards the source DU to release the UE context from the source DU, and the source DU receives the UE context release command/request from the CU. The source DU releases the UE context in response to the UE context release command/request. At signal 624, the source DU transmits a UE context release complete message towards the CU, and the CU receives the UE context release complete message from the source DU. At operation 625, the CU performs path switch to the target DU as the new DU supporting the serving cell.

The signals and operations of FIG. 6A and FIG. 6B are merely illustrative, and variations are contemplated to be within the scope of the present disclosure. For example, the signals and operations may assume one TA value per physical cell ID (PCI). In embodiments, to cover multi-TRP (multi-transmit receipt point) scenarios, the UE may be configured and required to acquire multiple TAs for a PCI, such as, for example, different TA values for different sets of TCI-states (transmission configuration indicator states). In embodiments, the signals and operations may include others not illustrated in FIG. 6A and FIG. 6B. In embodiments, the signals and operations may not include every signal and operation illustrated in FIG. 6A and FIG. 6B. In embodiments, the signals and operations may be implemented in a different order than that illustrated in FIG. 6A and FIG. 6B. Such and other embodiments are contemplated to be within the scope of the present disclosure.

Figure 7:
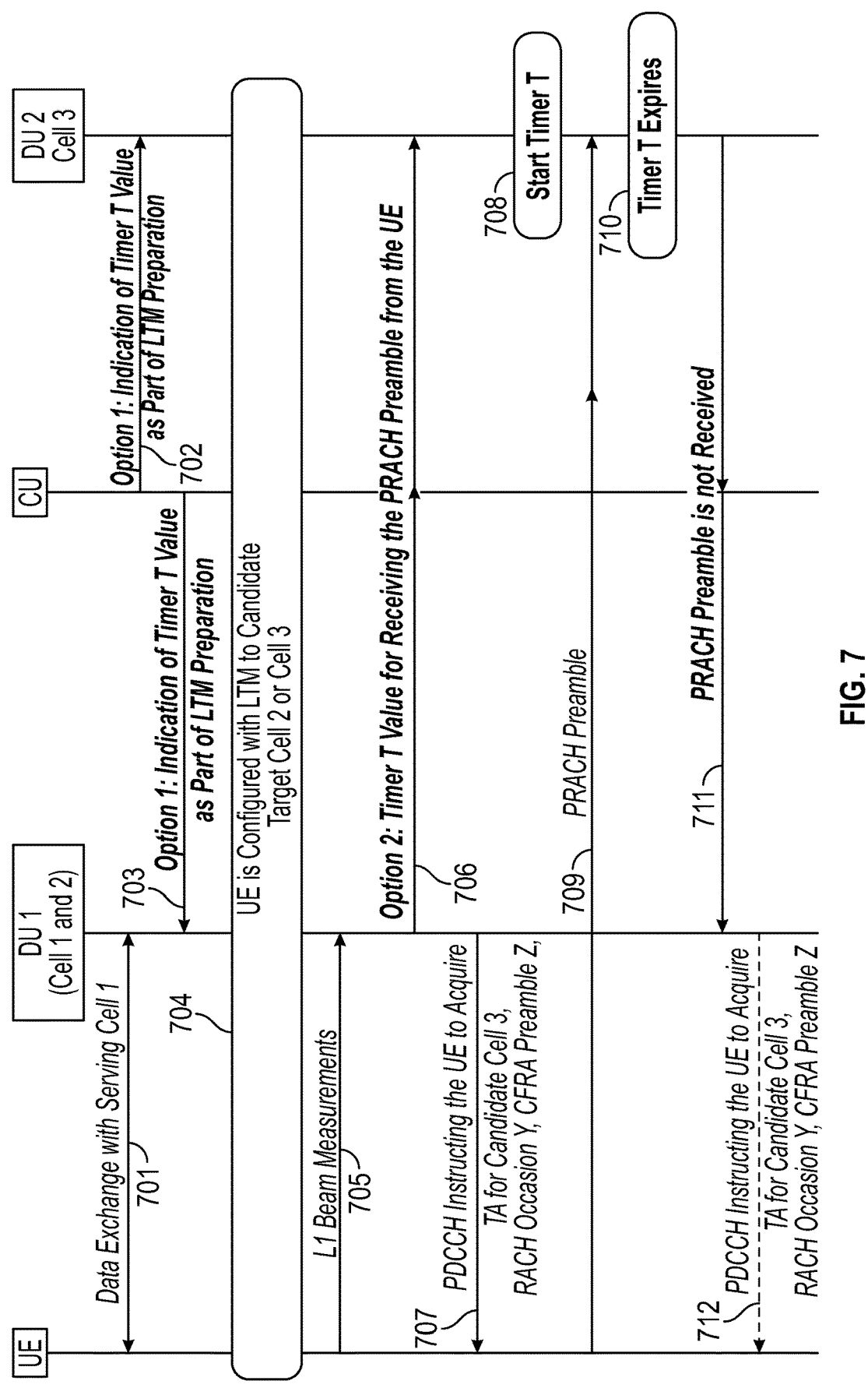
FIG. 7 is a diagram of an example embodiment of signals and operations among a UE, a CU, a source DU, a target DU, and other cells, according to one illustrated aspect of the disclosure.

Referring now to FIG. 7, example signals and operations for TA management are shown in relation to an inter-DU handover procedure where a target DU requests a UE to acquire TA for other candidate target cells with which a UE may connect after a cell switch. The handover procedure is merely illustrative, and it is contemplated that aspects of the disclosed technology may be applied to other procedures involving TA acquisition, such as, without limitation, dual connectivity, carrier aggregation, mTRP, and/or dynamic switching, among others. Additionally, the inter-DU scenario is illustrative, and aspects of the present disclosure may be applied to intra-DU scenarios, as well. Where the source DU and target DU are supported by different CUs, the source DU may be supported by a source CU and the target DU may be supported by a target CU, which can communicate via an Xn interface. As mentioned above, the terms "transmit towards," "receive from," and "cooperate with" (and their variations), include communications that may or may not involve communications through one or more intermediate devices or nodes. It is intended that any description referring to a DU shall also be treated as though the description refers to a network node that supports at least one of DU functionality or a layer 2 protocol of a radio access network (RAN). It is intended that any description referring to a CU shall also be treated as though the description refers to a network node that supports at least one of CU functionality or a layer 3 protocol of a radio access network (RAN).

Aspects of the signals and operations of FIG. 7 are the same as or similar to various signals and operations of FIG. 6A and FIG. 6B. For clarity, the signals and operations of FIG. 7 will be described in detail. Aspects of FIG. 7 are intended to be usable with aspects of FIG. 6A and FIG. 6B. The following paragraphs describe various signals and operations. It will be understood that the described signals may have associated operations, and the described operations may have associated signals. Accordingly, a described signal may also be an operation, and a described operation may also be a signal.

The following will now provide more details regarding various signals and operations of FIG. 7.

The disclosed technology provides a mechanism where a source DU controlling a serving cell may trigger the UE to perform re-transmission of the PRACH preamble based on an explicit indication from the target DU controlling the candidate target cell that the PRACH preamble was not received. As used herein, the terms source DU and/or serving DU may be used interchangeably.

At signal 701, UE 150 and a serving cell of a source DU have a data exchange. For example, the UE has established a connection with a DU (i.e., source DU) that supports the serving cell, which serves the UE 150, and has established a (logical) connection with the CU that supports the DU (e.g., a serving network node). In embodiments, a target DU controlling a prepared target cell sends an explicit indication to the source DU controlling the serving cell that the PRACH transmission of a specific UE has not been received, and accordingly, its TA could not be estimated.

In embodiments, the target DU may send an explicit indication to the source DU when a timer T has expired. In embodiments, for signal 702 and signal 703, the duration of timer T may be received from the CU by the source DU and/or a target DU during, for example, LTM preparation.

For operation 704, the UE may be configured for a handover, using LTM, to a candidate target cell.

For signal 705, L1 beam measurements are transmitted from the UE toward the source DU. The L1 beam measurements may be received by the source DU.

In embodiments, for signal 706, the duration of timer T is communicated by the source DU to the target DU when the source DU has triggered the UE to send the PRACH preamble transmission to the target cell. For example, when the target DU receives an indication from the source DU that the UE has been instructed to perform TA acquisition with respect to a target cell that is controlled by the target DU. The indication may include information about the time or/and CFRA resources (e.g., selected RACH preamble or/and RACH occasion) that the UE has been configured to perform RA.

At signal 707, the source DU may transmit toward the UE 150 a PDCCH order instructing the UE 150 to acquire TA for the candidate cell, the RACH occasion Y, and CFRA preamble Z. UE 150 may receive, from the source DU, the PDCCH order.

At signal 708, the timer T may be started when the target DU receives an indication from the source DU that the UE has been instructed to perform TA acquisition with respect to a target cell that is controlled by the target DU. The indication may include information about the time or/and CFRA resources (e.g., selected RACH preamble or/and RACH occasion) that the UE has been configured to perform RA.

At signal 709, a PRACH preamble may be transmitted from the UE 150 toward the target DU supporting a target cell.

In embodiments, the timer T may be stopped by the target DU when the target DU successfully receives the PRACH preamble transmission from the UE 150. In this case, the target DU sends the estimated TA of the UE to the source DU.

At operation 710, the timer T expires when the target DU fails to receive the PRACH preamble from the UE with the time duration of timer T. At signal 711, the target DU (e.g., DU 2) transmits an indication to the source DU that the timer T has expired and that the target DU failed to receive the PRACH preamble from the UE with the time duration of the timer T.

Signal 712 is optional. At signal 712, the source DU may transmit towards the UE 150 a PDCCH order instructing the UE 150 to acquire TA for the candidate target cell, the RACH occasion Y, and CFRA preamble Z. UE 150 may receive, from the source DU, the PDCCH order.

The disclosed technology provides the benefit of making the UE aware whether the UE shall re-trigger the PRACH transmissions in case the TA is received by the serving cell from the target cell. The disclosed technology provides the benefit of avoiding unnecessary PRACH re-transmissions in case the PRACH preamble has been successfully received by the target cell.

In embodiments, the source DU indicates to the UE the time duration (or, equivalently, the number of RACH Occasions) during which the UE is allowed to send the PRACH transmission towards the target cell. This provides the UE with some flexibility on when to send the PRACH preamble for early TA acquisition.

In embodiments, if the UE receives from the source DU another PDCCH order to (re-)transmit the PRACH preamble within a given time duration X (where X is received from the serving cell) for the same candidate target cell and for the same (or different) SSB, the UE ramps up its PRACH transmission power by a certain (e.g., given) factor compared to the transmission power of the last PRACH transmission towards that candidate target cell. This ensures that the UE ramps up its transmission only when the PRACH re-transmissions occur in time instants that are close to the time instant of each other's re-transmission. The disclosed technology provides the benefit of ensuring that the UE ramps up (i.e., increases) the PRACH preamble transmission power only when needed, i.e., when the PDCCH orders are not much apart from each other.

In embodiments, upon the reception of the PDCCH order instructing the UE to perform PRACH (re-)transmission towards the target cell using a specific SSB, the UE compares the L1-RSRP of SSB against a threshold. If the L1-RSRP is below the threshold, the UE informs the serving cell that the L1-RSRP of the SSB associated with the configured CFRA preamble is no longer sufficient to perform the PRACH preamble transmission. Otherwise, the UE performs the PRACH preamble transmission towards the target cell.

In embodiments, if configured by the serving cell, the UE would consider a plurality of SSBs for early TA acquisition in the case that the plurality of SSBs are received in different PDCCH orders for the same candidate target cell. In this case, the UE checks if any received signal power (e.g., L1-RSRP) is associated with an SSB of the plurality of SSBs is above a threshold. If yes, the UE uses the corresponding PRACH transmission for the early TA acquisition, otherwise, the UE informs the source DU that none of the configured SSBs can be used for the PRACH transmission. The disclosed technology provides the benefit of increasing the success rate of early TA acquisition by considering the SSBs received in different PDCCH orders for the same candidate cell.

In embodiments, the source DU may collect information indicating early TA acquisition success from multiple candidate cells, which may influence cell change selection, e.g., cell change to candidate target cell 1 with successful TA acquisition, no re-transmit of RA to target cell 2 with unsuccessful TA acquisition; trigger re-acquisition with other parameters and/or another preamble; and/or trigger TA acquisition to another cell, (e.g., candidate target cell 2, 3, and/or 4) with good measurement results;

In another example, early TA acquisition may be requested for candidate target cell 2 and candidate target cell 3. However, for example, early TA acquisition for candidate target cell 2 may be successful and early TA acquisition for candidate target cell 3 may not be successful. This may trigger early TA acquisition for candidate target cell 4.

In accordance with aspects of the present disclosure, an embodiment of operations from the perspective of the UE is as follows. In embodiments, the UE establishes a connection with a serving cell controlled by a serving network node (e.g., a source DU), the serving network node supports at least one of distributed unit, DU, functionality or a layer 2 protocol of a radio access network and which supports the serving cell; and performs configuration for L1/L2 triggered mobility (LTM) to a target cell, the target cell controlled by one of: the serving network node or a target network node (e.g., a target DU), the target network node supports at least one of distributed unit, DU, functionality or a layer 2 protocol of a radio access network and which supports the target cell. Prior to receiving a command to switch to the target cell: the UE transmits, to the target cell, a random access preamble for acquiring timing advance for the target cell; and the UE receives, from the serving network node, an instruction to re-transmit the random access preamble to the target cell for acquiring the timing advance for the target cell.

In accordance with aspects of the present disclosure, an embodiment of operations from the perspective of the network node, that supports at least one of central unit control plane (CU-CP) functionality or a layer 3 protocol of a radio access network, is as follows. In embodiments, the network node establishes a connection with a user equipment apparatus (UE) via a serving cell supported by a serving network node, the serving network node supports at least one of distributed unit, DU, functionality or a layer 2 protocol of a radio access network; transmits, to the UE, a message configured to prepare the UE for L1/L2 triggered mobility (LTM) to a target cell, the target cell controlled by one of: the serving network node or a target network node, the target network node supports at least one of distributed unit, DU, functionality or a layer 2 protocol of a radio access network, and which supports a target cell; and transmits to at least one of the serving network node or the target network node a duration of a timer T.

In accordance with aspects of the present disclosure, an embodiment of operations from the perspective of a network node, that supports at least one of central unit control plane (CU-CP) functionality or a layer 3 protocol of a radio access network, is as follows. In embodiments, the serving network node establishes a connection with a user equipment apparatus (UE) via a serving network node, wherein the serving network node supports at least one of distributed unit, DU, functionality or a layer 2 protocol of a radio access network and which supports a serving cell; and configures the serving network node for L1/L2 triggered mobility (LTM) and indicate a timer T to cause the serving network node to trigger the UE to perform re-transmission of a physical random access channel (PRACH) preamble based on an expiration of a timer T, wherein the timer T is configured to supervise a reception of an estimated timing advance (TA) from a target network node controlling a target cell among a set of candidate target cells, wherein the target network node supports at least one of distributed unit, DU, functionality or a layer 2 protocol of a radio access network and which supports the set of target cells.

In accordance with aspects of the present disclosure, an embodiment of operations from the perspective of the serving network node that supports at least one of distributed unit, DU, functionality or a layer 2 protocol of a radio access network, is as follows. In embodiments, the serving network node establishes a connection with a user equipment apparatus (UE) via a serving cell supported by the network node; determines that L1/L2 triggered mobility (LTM) towards a target cell is configured for the UE, the target cell controlled by one of: the serving network node or a target network node, the target network node supports at least one of distributed unit, DU, functionality or a layer 2 protocol of a radio access network, and which supports a target cell; prior to transmitting a command to connect to the target cell: transmits, towards the UE, a first message configured to cause the performance of acquiring a timing advance for the target cell; transmits, towards the target network node, a second message configured to cause the performance of monitoring and reporting receipt of a random access preamble from the UE; and monitors and determines whether a report is received from the target network node within a time window, and whether the report includes an information related to a successful or an unsuccessful acquisition of the timing advance, in case of a successful acquisition proceed with a first action, and in case of unsuccessful acquisition proceed with a second action, first and second action being different.

The signals and operations of FIG. 7 are merely illustrative, and variations are contemplated to be within the scope of the present disclosure. For example, the signals and operations may assume one TA value per physical cell ID (PCI). In embodiments, to cover multi-TRP (multi-transmit receipt point) scenarios, the UE may be configured and required to acquire multiple TAs for a PCI, such as, for example, different TA values for different sets of TCI-states (transmission configuration indicator states). In embodiments, the signals and operations may include others not illustrated in FIG. 7. In embodiments, the signals and operations may not include every signal and operation illustrated in FIG. 7. In embodiments, the signals and operations may be implemented in a different order than that illustrated in FIG. 7. Such and other embodiments are contemplated to be within the scope of the present disclosure.

Figure 8:
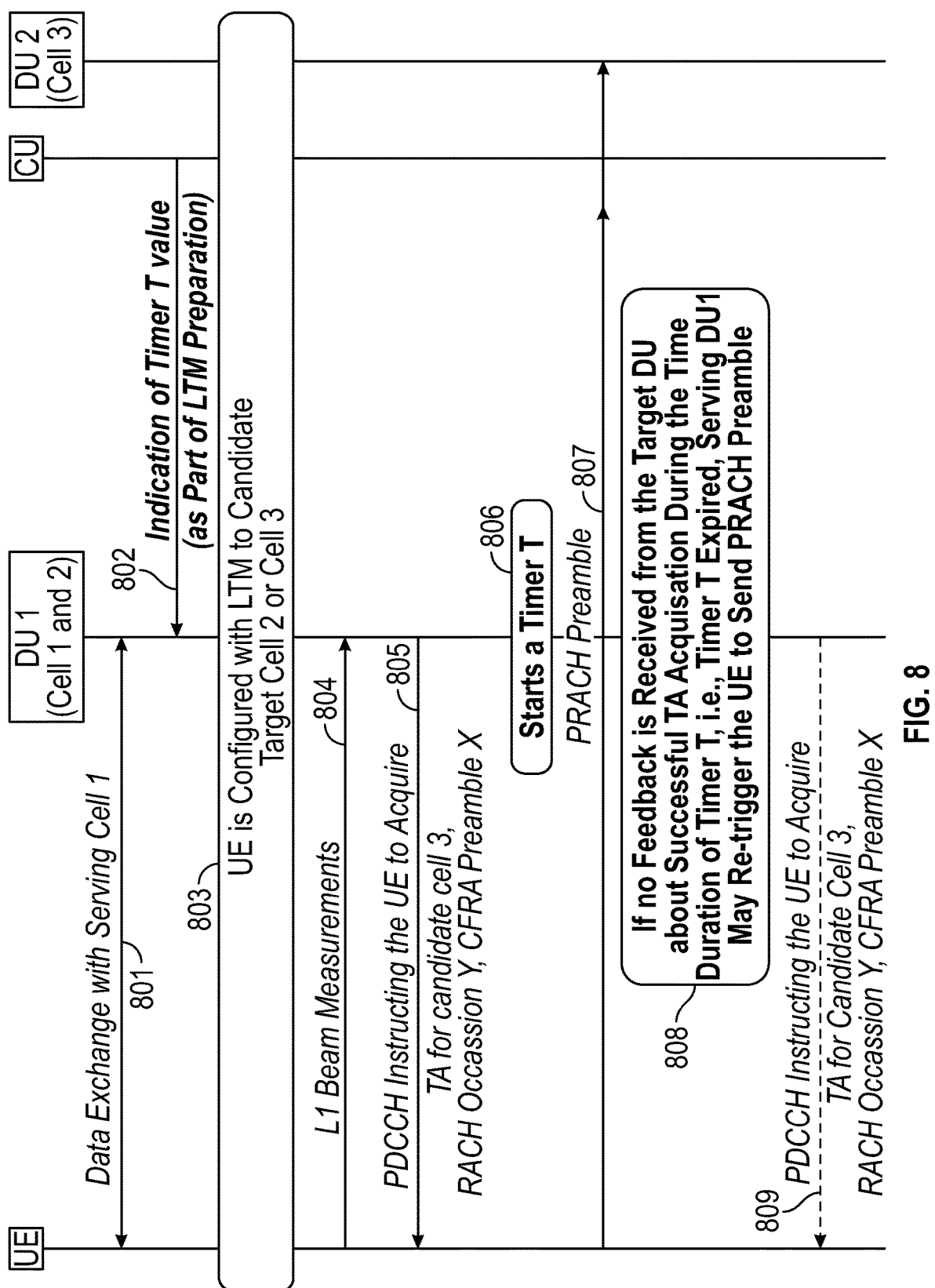
FIG. 8 is a diagram of an example embodiment of signals and operations among a UE, a CU, a source DU, a target DU, and other cells, according to one illustrated aspect of the disclosure.

Referring now to FIG. 8, example signals and operations for TA management are shown in relation to an inter-DU handover procedure where a target DU requests a UE to acquire TA for other candidate target cells with which a UE may connect after a cell switch. The handover procedure is merely illustrative, and it is contemplated that aspects of the disclosed technology may be applied to other procedures involving TA acquisition, such as, without limitation, dual connectivity, carrier aggregation, mTRP, and/or dynamic switching, among others. Additionally, the inter-DU scenario is illustrative, and aspects of the present disclosure may be applied to intra-DU scenarios, as well. Where the source DU and target DU are supported by different CUs, the source DU may be supported by a source CU and the target DU may be supported by a target CU, which can communicate via an Xn interface. As mentioned above, the terms "transmit towards," "receive from," and "cooperate with" (and their variations), include communications that may or may not involve communications through one or more intermediate devices or nodes. It is intended that any description referring to a DU shall also be treated as though the description refers to a network node that supports at least one of DU functionality or a layer 2 protocol of a radio access network (RAN). It is intended that any description referring to a CU shall also be treated as though the description refers to a network node that supports at least one of CU functionality or a layer 3 protocol of a radio access network (RAN).

Aspects of the signals and operations of FIG. 8 are the same as or similar to various signals and operations of FIG. 6A and FIG. 6B. For clarity, the signals and operations of FIG. 8 will be described in detail. Aspects of FIG. 8 are intended to be usable with aspects of FIG. 6A and FIG. 6B. The following paragraphs describe various signals and operations. It will be understood that the described signals may have associated operations, and the described operations may have associated signals. Accordingly, a described signal may also be an operation, and a described operation may also be a signal.

The following will now provide more details regarding various signals and operations of FIG. 8.

The disclosed technology provides a mechanism where a source DU controlling a serving cell may trigger the UE to perform re-transmission of the PRACH preamble based on the expiration of a timer that is supervising the reception of the estimated TA from a target DU.

The disclosed technology provides a mechanism where a source DU controlling a serving cell may trigger the UE to perform re-transmission of the PRACH preamble based on an explicit indication from the target DU controlling the candidate target cell that the PRACH preamble was not received. As used herein, the terms source DU and/or serving DU may be used interchangeably.

At signal 801, UE 150 and a serving cell of a source DU have a data exchange. For example, the UE has established a connection with a DU (i.e., source DU) that supports the serving cell, which serves the UE, and has established a (logical) connection with the CU that supports the DU (e.g., a serving network node).

At signal 802 the CU may transmit towards the source DU an indication of a duration of timer T as a part of LTM preparation. The source DU may receive the duration of timer T from the CU.

For operation 803, the UE 150 may be configured for a handover, using LTM, to a candidate target cell.

For signal 804, L1 beam measurements are transmitted from the UE towards the source DU. The L1 beam measurements may be received by the source DU.

At signal 805, the source DU may transmit towards the UE 150 a PDCCH order instructing the UE 150 to acquire TA for the candidate target cell, the RACH occasion Y, and CFRA preamble Z. UE 150 may receive, from the source DU, the PDCCH order.

At operation 806, the timer T may be started. In embodiments, the timer T may be started when the source DU instructs the UE to perform PRACH preamble transmission towards the target cell. In embodiments, the timer T may be started from the time the source DU receives acknowledgment messages from the UE with respect to the provided instructions. In embodiments, the timer T can may be started from the subsequent RO after receiving the acknowledgment message.

At signal 807, UE 150 transmits the PRACH preamble towards the target DU.

At signal 808, upon expiry of the timer T, the source DU may trigger the UE to perform a re-transmission of the PRACH preamble. The timer T may be stopped when the source DU receives from the target DU the estimated TA value for the UE. For example, in the case that feedback was not received from the target DU indicating a successful TA acquisition during the duration of timer T (i.e., timer T expired), the source DU may retrigger the UE 150 to transmit the PRACH preamble. In embodiments, the source DU may instruct the UE to cancel the TA acquisition for a candidate cell. The source DU can make this decision based on the L1 beam measurements that are received from the UE. For example, when the quality of the SSB given in the PDCCH order falls below a threshold (determined from the L1 measurement reports), e.g., within a certain time after sending the PDCCH order.

Signal 809 is optional. At signal 809, the source DU may transmit towards the UE 150 a PDCCH order instructing the UE 150 to acquire TA for the candidate target cell, the RACH occasion Y, and CFRA preamble Z. UE 150 may receive, from the source DU, the PDCCH order.

In embodiments, the serving cell may trigger the UE to perform re-transmission of the PRACH preamble based on the expiration of a timer supervising the reception of the estimated TA from the target DU.

The signals and operations of FIG. 8 are merely illustrative, and variations are contemplated to be within the scope of the present disclosure. For example, the signals and operations may assume one TA value per physical cell ID (PCI). In embodiments, to cover multi-TRP (multi-transmit receipt point) scenarios, the UE may be configured and required to acquire multiple TAs for a PCI, such as, for example, different TA values for different sets of TCI-states (transmission configuration indicator states). In embodiments, the signals and operations may include others not illustrated in FIG. 8. In embodiments, the signals and operations may not include every signal and operation illustrated in FIG. 8. In embodiments, the signals and operations may be implemented in a different order than that illustrated in FIG. 8. Such and other embodiments are contemplated to be within the scope of the present disclosure.

Further embodiments of the present disclosure include the following examples.

Example 1. A user equipment apparatus comprising:

at least one processor; and at least one memory storing instructions which, when executed by the at least one processor, cause the user equipment apparatus at least to:

establish a connection with a serving cell controlled by a serving network node, the serving network node supports at least one of distributed unit, DU, functionality or a layer 2 protocol of a radio access network and which supports the serving cell;

perform configuration for L1/L2 triggered mobility (LTM) to a target cell, the target cell controlled by one of the serving network node or a target network node, the target network node supports at least one of distributed unit, DU, functionality or a layer 2 protocol of a radio access network and which supports the target cell;

prior to receiving a command to switch to the target cell:

transmit, towards the target cell, a random access preamble for acquiring timing advance for the target cell; and receive, from the serving network node, an instruction to re-transmit the random access preamble to the target cell for acquiring the timing advance for the target cell.

Example 2. The user equipment apparatus of Example 1, wherein the instructions when executed by the at least one processor, further cause the user equipment apparatus at least to:

prior to transmitting the random access preamble to the target cell, receive a first order to transmit the random access preamble; and after transmitting the random access preamble to the target cell and prior to receiving a command to switch to the target cell:

receive from the serving network node a second order to transmit the random access preamble for the target cell, and increase a transmission power for transmitting the random access preamble based on the second order above a transmission power used to transmit the random access preamble towards that target cell based on the first order if the second order is received within a predetermined time duration wherein the time duration is received from the serving network node.

Example 3. The user equipment apparatus of Example 1, wherein the instructions when executed by the at least one processor, further cause the user equipment apparatus at least to:

receive a first order instructing the user equipment apparatus (UE) to perform a random access preamble transmission towards the target network node including an SSB;

determine that a received signal power associated with a configured contention-free random access (CFRA) preamble of the SSB is below a threshold value; and in response to the determination, at least one of:

transmit, towards the serving network node, an indication that the received signal power of the SSB associated with the configured CFRA preamble is no longer sufficient to perform the random access preamble transmission; or transmit the random access preamble to the target network node.

Example 4. The user equipment apparatus of Example 1, wherein the instructions when executed by the at least one processor, further cause the user equipment apparatus at least to:

determine that a plurality of SSBs are received in different orders for the target cell;

consider the plurality of SSBs as candidates for early TA acquisition based on the determination;

determine that any received signal power that is associated with an SSB of the plurality of SSBs is above a threshold;

use a corresponding random access preamble transmission for an early TA acquisition based on the determination; or transmit, towards the serving network node, an indication that none of the plurality of SSBs can be used for transmission of the random access preamble to the target cell.

Example 5. The user equipment apparatus of Example 1, wherein the instructions when executed by the at least one processor, further cause the user equipment apparatus at least to:

receive, from the serving network node, a second instruction to acquire timing advance for the target cell, wherein the instruction to acquire timing advance for the target cell further includes at least one of: a RACH occasion different than a RACH occasion of the first instruction, a second random access preamble different than the random access preamble of the first instruction, an instruction to cause the performance of retransmitting the random access preamble of the first instruction, or an instruction that when the second instruction is sent within certain time window after the first instruction cause the performance by the UE of increasing a power of the random access preamble transmission.

Example 6. A network node that supports at least one of central unit control plane (CU-CP) functionality or a layer 3 protocol of a radio access network, comprising:

at least one processor; and at least one memory storing instructions which, when executed by the at least one processor, cause the network node at least to:

establish a connection with a user equipment apparatus (UE) via a serving cell supported by a serving network node, the serving network node supports at least one of distributed unit, DU, functionality or a layer 2 protocol of a radio access network;

transmit, towards the UE, a message configured to prepare the UE for L1/L2 triggered mobility (LTM) to a target cell, the target cell controlled by one of the serving network node or a target network node, the target network node supports at least one of distributed unit, DU, functionality or a layer 2 protocol of a radio access network, and which supports a target cell; and transmit to at least one of the serving network node or the target network node a duration of a timer T.

Example 7. The network node of Example 6, wherein the instructions when executed by the at least one processor, further cause the network node at least to:

receive, from the target network node, an indication that the random access preamble transmission has not been received from the UE and that a timing advance (TA) value could not be estimated; and prior to transmitting a command to switch to the target cell:

cause the serving network node to transmit, toward the UE, an instruction to transmit a random access preamble to the target cell for acquiring timing advance for the target cell; and cause the serving network node to transmit, toward the UE, an instruction to re-transmit the random access preamble to the target cell for acquiring the timing advance for the target cell, in response to the indication from the target network node.

Example 8. The network node of Example 6, wherein the instructions when executed by the at least one processor, further cause the network node at least to:

cause the target network node to transmit the indication to the serving network node when the timer T has expired.

Example 9. The network node of Example 8, wherein a duration of the timer T is transmitted to the target network node during L1/L2 triggered mobility (LTM) preparation.

Example 10. The user network node of Example 8, wherein a duration of the timer T is transmitted towards the target network node when the serving network node has triggered the UE to send the random access preamble transmission to the target cell.

Example 11. The network node of Example 10, wherein the timer T is initiated based on the target network node receiving an indication from the serving network node that the UE has been instructed to perform TA acquisition with respect to a target cell among a set of candidate target cells that is controlled by the target network node.

Example 12. The network node of Example 11, wherein the indication includes information about at least one of a time occasion or a contention-free random access (CFRA) resource that the UE has been configured to perform random access (RA).

Example 13. The network node of Example 8, wherein the instructions when executed by the at least one processor, further cause the network node at least to:

cause the target network node to stop the timer T when the target network node successfully receives the random access preamble transmission from the UE; and cause the target network node to transmit an estimated TA of the UE to the serving network node.

Example 14. The user network node of Example 8, wherein the timer T expires when the target network node fails to receive the random access preamble from the UE within a time duration of timer T.

Example 15. A network node that supports at least one of central unit control plane (CU-CP) functionality, or a layer 3 protocol of a radio access network, and supporting a serving cell, comprising:

at least one processor; and at least one memory storing instructions which, when executed by the at least one processor, cause the network node at least to:

establish a connection with a user equipment apparatus (UE) via a serving network node, wherein the serving network node supports at least one of distributed unit, DU, functionality or a layer 2 protocol of a radio access network and which supports a serving cell; and configure the serving network node for L1/L2 triggered mobility (LTM) and indicate a timer T to cause the serving network node to trigger the UE to perform re-transmission of a physical random access channel (PRACH) preamble based on an expiration of a timer T, wherein the timer T is configured to supervise a reception of an estimated timing advance (TA) from a target network node controlling a target cell among a set of candidate target cells, wherein the target network node supports at least one of distributed unit, DU, functionality or a layer 2 protocol of a radio access network and which supports the set of target cells.

Example 16. The network node of Example 15, wherein the instructions when executed by the at least one processor, further cause the network node at least to:

transmit a duration of timer T to the serving cell.

Example 17. The network node of Example 15, wherein the instructions when executed by the at least one processor, further cause the network node at least to:

initiate the timer T in response to the UE receiving a communication from the DU to perform a transmission of the random access preamble to the target cell.

Example 18. The network node of Example 15, wherein the instructions when executed by the at least one processor, further cause the network node at least to:

receive an acknowledgement message from the UE with respect to instructions received by the UE; and initiate the timer T from the time the serving network node in response to the received acknowledgement message.

Example 19. The network node of Example 14, wherein the instructions when executed by the at least one processor, further cause the network node at least to:

receive an estimated TA value for the UE from the target network node; and stop the timer T in response to the received.

Example 20. The network node of Example 14, wherein the instructions when executed by the at least one processor, further cause the network node at least to:

determine the expiration of the timer T; and transmit an instruction to the UE to perform re-transmission of the random access preamble upon expiration of the timer T.

Example 21. The network node of Example 15, wherein the instructions when executed by the at least one processor, further cause the network node at least to:

receive a measurement report from the UE;

determine whether to cancel TA acquisition for a target cell based on the measurement report; and transmit an instruction to the UE to cancel the TA acquisition for the target cell based on the determination.

Example 22. The network node of Example 15, wherein the instructions when executed by the at least one processor, further cause the network node at least to:

transmit an indication to the UE of at least one of a time duration or a number of RACH occasions during which the UE is allowed to transmit the random access preamble towards the target cell.

Example 23. A serving network node that supports at least one of distributed unit, DU, functionality or a layer 2 protocol of a radio access network, comprising:

at least one processor; and at least one memory storing instructions which, when executed by the at least one processor, cause the serving network node at least to:

establish a connection with a user equipment apparatus (UE) via a serving cell supported by the network node;

determine that L1/L2 triggered mobility (LTM) towards a target cell is configured for the UE, the target cell controlled by one of: the serving network node or a target network node, the target network node supports at least one of distributed unit, DU, functionality or a layer 2 protocol of a radio access network, and which supports a target cell;

prior to transmitting a command to connect to the target cell:

transmit, towards the UE, a first instruction configured to cause the performance of acquiring a timing advance for the target cell;

transmit, towards the target network node, a second instruction configured to cause the performance of monitoring and reporting receipt of a random access preamble from the UE; and monitor and determine whether a report is received from the target network node within a time window, and whether the report includes an information related to a successful or an unsuccessful acquisition of the timing advance, in case of a successful acquisition proceed with a first action, and in case of unsuccessful acquisition proceed with a second action, first and second action being different.

Example 24. The serving network node of Example 23, wherein the second instruction includes at least one of a timer T duration or a value of the time window.

Example 25. The serving network node of Example 23, wherein the at least one of a timer T duration or a value of the time window is received from a network node that supports at least one of central unit control plane (CU-CP) functionality or a layer 3 protocol of a radio access network.

Example 26. The serving network node of Example 23, wherein the instructions when executed by the at least one processor, further cause the serving network node at least to:

receive an L1 measurement report; and determine whether to switch or connect UE towards target cell based on the L1 measurement report.

Example 27. The serving network node of Example 25, wherein the instructions when executed by the at least one processor, further cause the serving network node at least to:

transmit, towards the UE, a second instruction to acquire timing advance for the target cell, and, towards the target network node.

Example 28. The serving network node of Example 27, wherein the second instruction includes at least one of: a RACH occasion different than a RACH occasion of the first instruction, a second random access preamble different than the random access preamble of the first instruction, an instruction to cause the performance of retransmitting the random access preamble of the first instruction, or an instruction that when the second instruction is sent within certain time window after the first instruction cause the performance by the UE of increasing a power of the random access preamble transmission.

Example 29. The serving network node of Example 27, wherein the instructions when executed by the at least one processor, further cause the serving network node at least to:

stop considering the target cell for a potential cell change;

monitor receipt of L1 measurement report;

determine whether to switch or connect UE towards a second target cell based on L1 measurement report; and transmit, towards the UE, a second instruction to acquire timing advance for the second target cell, based on the determination.

Example 30. The serving network node of Example 27, wherein the instructions when executed by the at least one processor, further cause the serving network node at least to:

determine whether a successful acquisition of a timing advance related to a second target cell has been received; and stop considering the target cell for a potential cell change based on the determination.

The embodiments and aspects disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an aspect," "in aspects," "in various aspects," "in some aspects," or "in other aspects" may each refer to one or more of the same or different aspects in accordance with this disclosure. The phrase "a plurality of" may refer to two or more.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, Python, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

While aspects of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular aspects. Those skilled in the art will envision other modifications within the scope and spirit of the claims appended hereto.

What is claimed is:

1. A network node that supports at least one of central unit control plane (CU-CP) functionality or a layer 3 protocol of a radio access network, comprising:
at least one processor; and
at least one memory storing instructions which, when executed by the at least one processor, cause the network node at least to:
establish a connection with a user equipment apparatus (UE) via a serving cell supported by a serving network node, the serving network node supports at least one of distributed unit, DU, functionality or a layer 2 protocol of a radio access network;
transmit, towards the UE, a message configured to prepare the UE for L1/L2 triggered mobility (LTM) to a target cell, the target cell controlled by one of: the serving network node or a target network node, the target network node supports at least one of distributed unit, DU, functionality or a layer 2 protocol of a radio access network, and which supports a target cell;
transmit, towards at least one of the serving network node or the target network node, a duration of a timer T;
receive, from the target network node, an indication that the random access preamble transmission has not been received from the UE and that a timing advance (TA) value could not be estimated; and
prior to transmitting a command to switch to the target cell:
cause the serving network node to transmit, toward the UE, an instruction to transmit a random access preamble to the target cell for acquiring timing advance for the target cell; and
cause the serving network node to transmit, toward the UE, an instruction to re-transmit the random access preamble to the target cell for acquiring the timing advance for the target cell, in response to the indication from the target network node.

2. The network node of claim 1, wherein the instructions when executed by the at least one processor, further cause the network node at least to:
cause the target network node to transmit the indication to the serving network node when the timer T has expired.

3. The network node of claim 2, wherein a duration of the timer T is transmitted towards the target network node during L1/L2 triggered mobility (LTM) preparation.

4. The network node of claim 2, wherein a duration of the timer T is transmitted towards the target network node when the serving network node has triggered the UE to send the random access preamble transmission to the target cell.

5. The network node of claim 4, wherein the timer T is initiated based on the target network node receiving an indication from the serving network node that the UE has been instructed to perform TA acquisition with respect to a target cell among a set of candidate target cells that is controlled by the target network node.

6. The network node of claim 5, wherein the indication includes information about at least one of a time occasion or a contention-free random access (CFRA) resource that the UE has been configured to perform random access (RA).

7. The network node of claim 2, wherein the instructions when executed by the at least one processor, further cause the network node at least to:

cause the target network node to stop the timer T when the target network node
successfully receives the random access preamble transmission from the UE; and
cause the target network node to transmit an estimated TA of the UE towards the serving network node.

8. The network node of claim 2, wherein the timer T expires when the target network node fails to receive the random access preamble from the UE within a time duration of timer T.

9. A serving network node that supports at least one of distributed unit, DU, functionality or a layer 2 protocol of a radio access network, comprising:
at least one processor; and
at least one memory storing instructions which, when executed by the at least one processor, cause the serving network node at least to:
establish a connection with a user equipment apparatus (UE) via a serving cell supported by the serving network node;
determine that L1/L2 triggered mobility (LTM) towards a target cell is configured for the UE, the target cell controlled by one of: the serving network node or a target network node, the target network node supports at least one of distributed unit, DU, functionality or a layer 2 protocol of a radio access network, and which supports a target cell;
prior to transmitting a command to connect to the target cell:
transmit, towards the UE, a first instruction configured to cause the performance of acquiring a timing advance for the target cell;
transmit, towards the target network node, a second instruction configured to cause the performance of monitoring and reporting receipt of a random access preamble from the UE; and
monitor and determine whether a report is received from the target network node within a time window, and whether the report includes an information related to a successful or an unsuccessful acquisition of the timing advance,
in case of a successful acquisition proceed with a first action, and in case of unsuccessful acquisition proceed with a second action, first and second action being different.

10. The serving network node of claim 9, wherein the second instruction includes at least one of a timer T duration or a value of the time window.

11. The serving network node of claim 9, wherein the at least one of a timer T duration or a value of the time window is received from a network node that supports at least one of central unit control plane (CU-CP) functionality or a layer 3 protocol of a radio access network.

12. The serving network node of claim 11, wherein the instructions when executed by the at least one processor, further cause the serving network node at least to:
transmit, towards the UE, a second instruction to acquire timing advance for the target cell, and, towards the target network node.

13. The serving network node of claim 12, wherein the second instruction includes at least one of: a RACH occasion different than a RACH occasion of the first instruction, a second random access preamble different than the random access preamble of the first instruction, an instruction to cause the performance of retransmitting the random access preamble of the first instruction, or an instruction that when the second instruction is sent within certain time window after the first instruction further cause the performance by the UE of increasing a power of the random access preamble transmission.

14. The serving network node of claim 12, wherein the instructions when executed by the at least one processor, further cause the serving network node at least to:

stop considering the target cell for a potential cell change;

monitor receipt of L1 measurement report;

determine whether to switch or connect UE towards a second target cell based on L1 measurement report; and transmit, towards the UE, a second instruction to acquire timing advance for the second target cell, based on the determination.

15. The serving network node of claim 12, wherein the instructions when executed by the at least one processor, further cause the serving network node at least to:

determine whether a successful acquisition of a timing advance related to a second target cell has been received; and stop considering the target cell for a potential cell change based on the determination.

16. The serving network node of claim 9, wherein the instructions when executed by the at least one processor, further cause the serving network node at least to:

receive an L1 measurement report; and determine whether to switch or connect UE towards target cell based on the L1 measurement report.

\* \* \* \* \*